United States Patent
Ichimura

(10) Patent No.: US 6,501,968 B1
(45) Date of Patent: *Dec. 31, 2002

(54) BATTERY-POWERED COMMUNICATIONS APPARATUS

(75) Inventor: Akira Ichimura, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 59 days.

(21) Appl. No.: 09/061,491

(22) Filed: Apr. 17, 1998

(30) Foreign Application Priority Data

Apr. 21, 1997 (JP) .............................. 9-116035

(51) Int. Cl.[7] ................................................. H04B 1/78
(52) U.S. Cl. .................... 455/574; 455/575; 379/433.08
(58) Field of Search ................................. 455/556, 419, 455/420, 423, 425, 550, 557, 566, 571–574, 575, 90, 343; 379/433.08; 340/309.75

(56) References Cited

U.S. PATENT DOCUMENTS

| | | | | | |
|---|---|---|---|---|---|
| 4,794,649 A | * | 12/1988 | Fujiwara | ........................ | 455/9 |
| 4,839,639 A | * | 6/1989 | Sato et al. | .............. | 340/825.44 |
| 5,036,532 A | * | 7/1991 | Metroka et al. | ............. | 455/566 |
| 5,239,694 A | * | 8/1993 | Toyoshima | .................. | 455/115 |
| 5,256,500 A | * | 10/1993 | Ishimoto | ....................... | 429/93 |
| 5,483,574 A | * | 1/1996 | Yuyama | ........................ | 379/32 |
| 5,519,506 A | * | 5/1996 | D'Avello et al. | ............ | 358/400 |
| 5,581,599 A | * | 12/1996 | Tsuji et al. | .................. | 455/415 |
| 5,587,924 A | * | 12/1996 | Rossi | ........................... | 364/496 |
| 5,608,545 A | * | 3/1997 | Kagawa | ....................... | 358/468 |
| 5,613,220 A | * | 3/1997 | Arai | ............................ | 455/88 |
| 5,648,762 A | | 7/1997 | Ichimura et al. | ........ | 340/825.31 |
| 5,658,682 A | * | 8/1997 | Usuda et al. | .................. | 429/92 |
| 5,870,680 A | * | 2/1999 | Guerlin et al. | .............. | 455/557 |
| 5,898,930 A | * | 4/1999 | Terashima et al. | ........... | 455/550 |
| 5,949,484 A | * | 9/1999 | Nakaya et al. | .............. | 348/384 |
| 6,005,367 A | * | 12/1999 | Rohde | ......................... | 320/106 |
| 6,051,957 A | * | 4/2000 | Klein | .......................... | 320/132 |
| 6,235,869 B1 | * | 5/2001 | Adachi et al. | .............. | 455/572 |
| 6,275,712 B1 | * | 8/2001 | Gray et al. | .................. | 455/522 |

FOREIGN PATENT DOCUMENTS

| | | | |
|---|---|---|---|
| JP | 06-347886 | | 12/1994 |
| JP | 07-120538 | | 5/1995 |
| JP | 09-037483 | | 7/1995 |
| JP | 07-219683 | | 8/1995 |
| WO | WO96/27987 | * | 9/1996 |

* cited by examiner

*Primary Examiner*—Nay Maung
*Assistant Examiner*—Charles Craver
(74) *Attorney, Agent, or Firm*—Morgan & Finnegan LLP

(57) ABSTRACT

A battery-powered communications apparatus has a communications unit and an additional function unit. The additional function unit is controlled in dependence upon residual battery capacity in such a manner that the communications unit can be used until a time set by the a time setting unit.

69 Claims, 12 Drawing Sheets

BATTERY-POWERED COMMUNICATIONS APPARATUS

BACKGROUND OF THE INVENTION

This invention relates to a communications apparatus powered by a battery.

Recent advances in semiconductor techniques have led to devices of increasingly smaller size. This has made it possible to manufacture battery-powered electrical devices such as a miniature communications terminal with functions other than those of the communications terminal. For example, a device that combines a portable telephone with a digital camera makes it possible for an image captured by the digital camera to be transmitted immediately by using the data communications function of the portable telephone. Combining a communications function with others functions, in this manner, makes it possible to provide greater convenience.

When a portable telephone and a digital camera, which have been cited above as an example of a device combining a communications function with additional functions, are driven by a single power supply (battery), a large amount of the battery power is consumed by the digital camera and situations arise in which the battery becomes incapable of supplying sufficient power to the portable telephone, thereby rendering the telephone function useless, before the user becomes aware of it.

SUMMARY OF THE INVENTION

Accordingly, an object of the present invention is to improve a battery-powered communications apparatus having a communications function combined with another function.

Another object of the present invention is to prevent undesirable consumption of power.

Another object of the present invention is to prevent excessive use of a function other than a communications function.

Another object of the present invention is to prevent excessive use of functions other than a communications function, thereby preventing the communications function from becoming unusable.

A further object of the present invention is to be able to use a communications function, with certainty, until a pre-determined time.

A further object of the present invention is to provide a communications apparatus in which functions other than a communications function are controlled dependent upon time and battery status.

A further object of the present invention is to provide a communications apparatus which presents a notification conforming to time and the status of a battery during the charging of the battery.

A further object of the present invention is to provide a communications apparatus in which communication means is capable of being used until the time expected that the battery is charged next.

A further object of the present invention is to provide a communications apparatus in which control consumption of power conforming to the location expected that the battery is charged next.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described with reference to the accompanying drawings.

Figure 1:
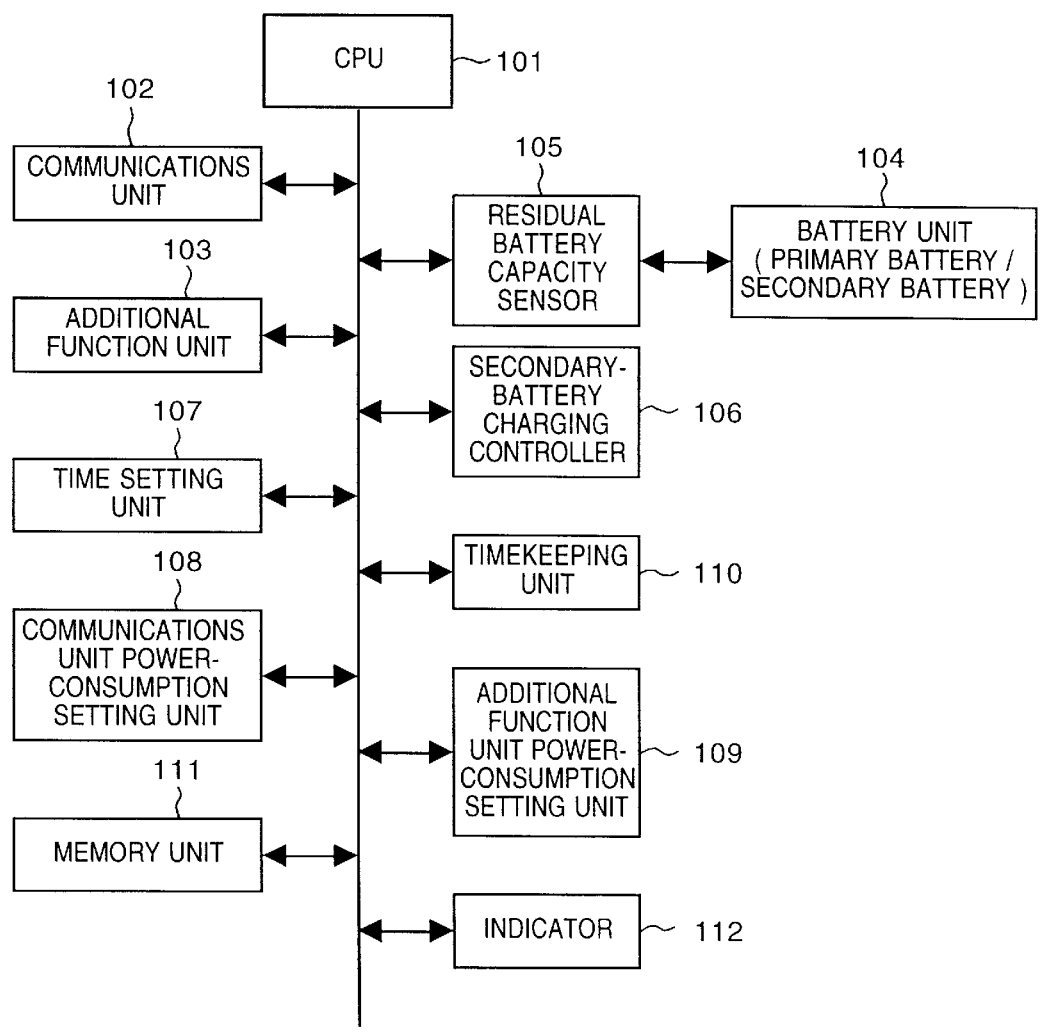
FIG. 1 is a block diagram showing a configuration of a battery-powered system having a communications function and an additional function besides the communications function according to an embodiment of the present invention.

Reference will first be made to FIG. 1 to describe the configuration of a battery-powered system having a communications function and an additional function, besides the communications function, according to an embodiment of the present invention. The system comprises a CPU 101, a communications unit 102, an additional function unit 103, a battery unit 104, a residual battery energy sensor 105, a secondary-battery charging controller 106, a time setting unit 107, a communications unit power-consumption setting unit 108, an additional function unit power-consumption setting unit 109, a timekeeping unit 110, a memory unit 111 and indicator 112.

The CPU 101 controls the overall system and executes processing of the type indicated by flowcharts (described later) on the basis of a control program. The communications unit 102 implements a communications function, e.g., the function of a portable telephone, and notifies the CPU 101 of its operating mode, i.e., whether a call is in progress or the unit is standing by for a call. The additional function unit 103 implements a function other than the communications function, e.g., the function of a digital camera or the like, and is controlled by the CPU 101. The additional function unit 103 may capture images but it should be noted that the additional function unit 103 is not limited to the digital camera function but can have any additional function as necessary.

The battery unit 104 is the power supply for the overall system and comprises a primary battery (a dry cell or the like) or a secondary battery (a lead storage battery, alkaline storage battery, etc.). The residual battery energy sensor 105 senses the residual energy of the battery unit 104 and notifies the CPU 101. If the battery unit 104 is a secondary battery, the secondary-battery charging controller 106 controls the charging of the secondary battery. The time setting unit 107 sets the time until which it is desired for the communications unit 102 to be usable. According to this embodiment, the time setting unit 107 is constructed as an independent functional block. However, the invention is not limited to this arrangement and it is permissible for the time setting unit 107 to be included in the communications unit 102.

The communications unit power-consumption setting unit 108 sets the power consumption of the communications unit 102. According to this embodiment, the communications unit power-consumption setting unit 108 is constructed as an independent functional block for explanation purposes. However, the invention is not limited to this arrangement and it is permissible for the communications unit power-consumption setting unit 108 to be included in the communications unit 102. The additional function unit power-consumption setting unit 109 sets the power consumption of the additional function unit 103. The timekeeping unit 110 notifies the CPU 101 of the present time. The memory unit 111 stores data needed by each system component based upon control performed by the CPU 101. Numeral 112 denotes an indicator. It should be noted that the power consumption of the communications unit 102 and the power consumption of the additional function unit 103 may be pre-registered in the memory unit 111. Further, the arrangement illustrated in the specification of Japanese Patent Application Laid-Open (KOKAI) No. 7-120538 can be used as the residual battery energy sensor 105. Though Japanese Patent Application Laid-Open No. 7-120538 displays the remaining capacity of a secondary battery, in this embodiment the remaining capacity of a secondary battery is input to the CPU 101.

Figure 4:
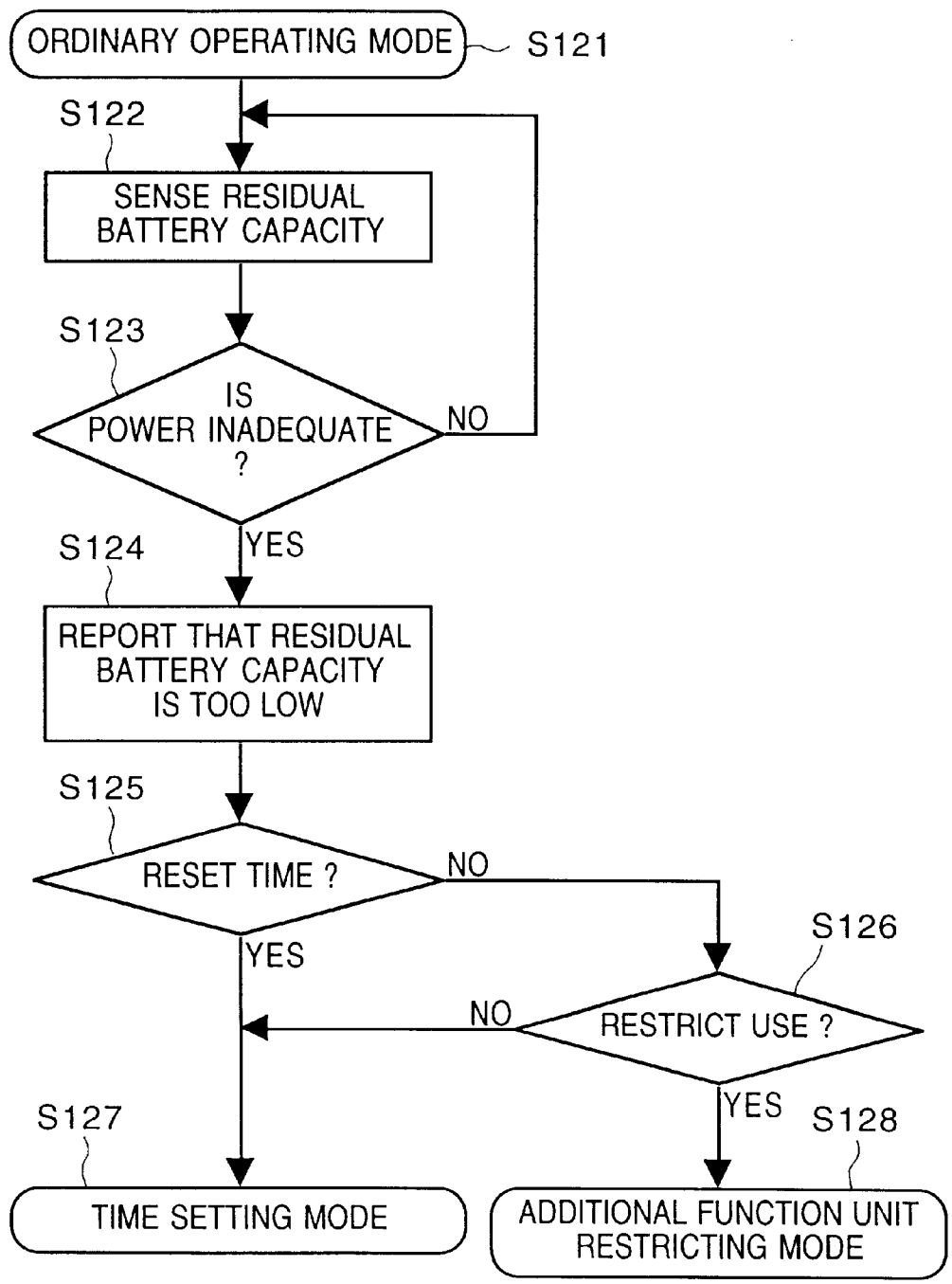
FIG. 4 is a flowchart of an ordinary operating mode according to the embodiment.
Figure 5:
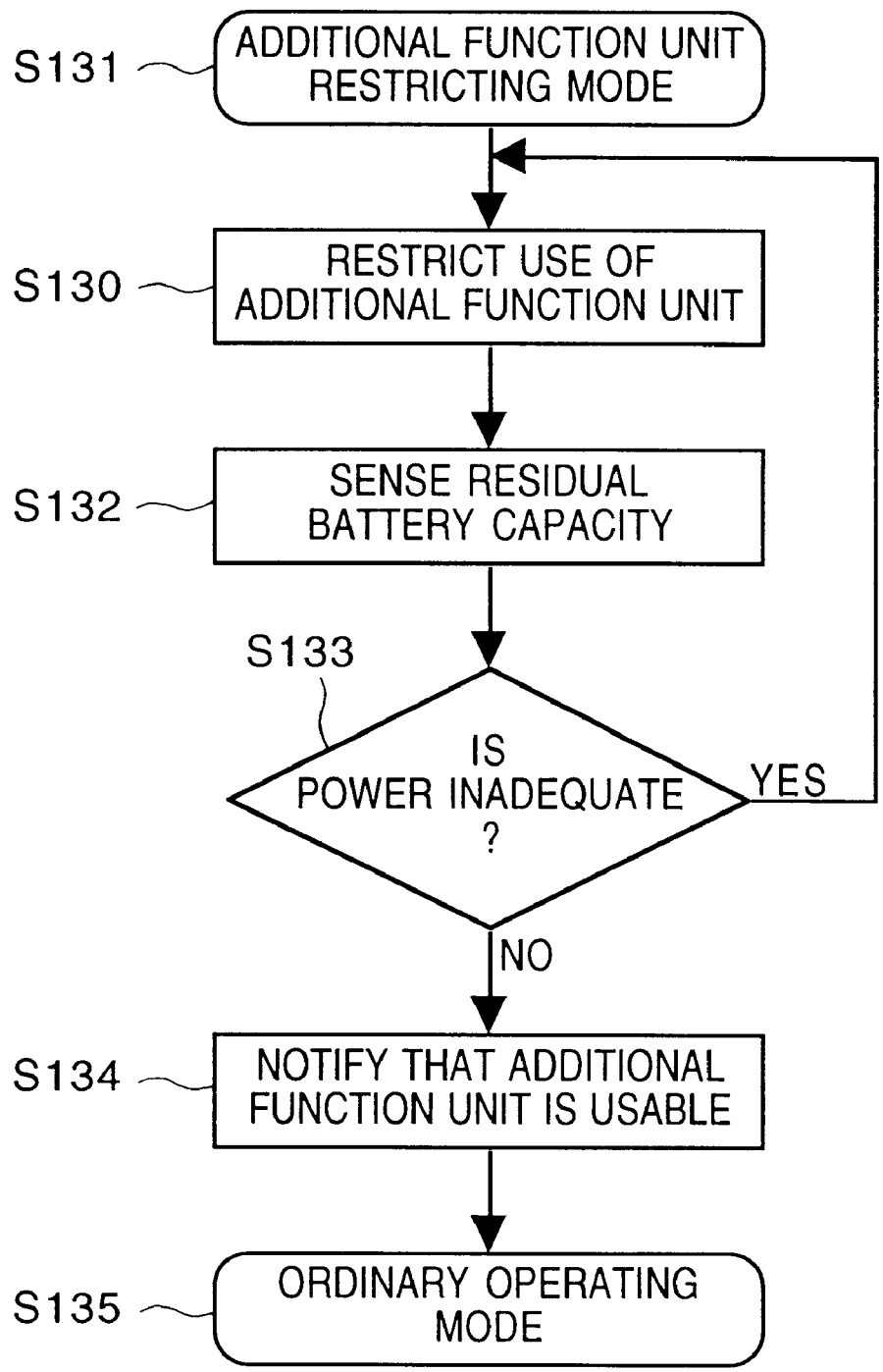
FIG. 5 is a flowchart of an additional-function restricting mode according to the embodiment.

The operation of this battery-powered system having a communications function and an additional function other than the communications function according to this embodiment will be described in regard to a time setting mode (FIGS. 2 and 3) in which the time until which the communications unit 102 is desired to be usable is set, an ordinary operating mode (FIG. 4) and an additional function unit restricting mode (FIG. 5).

Figure 2:
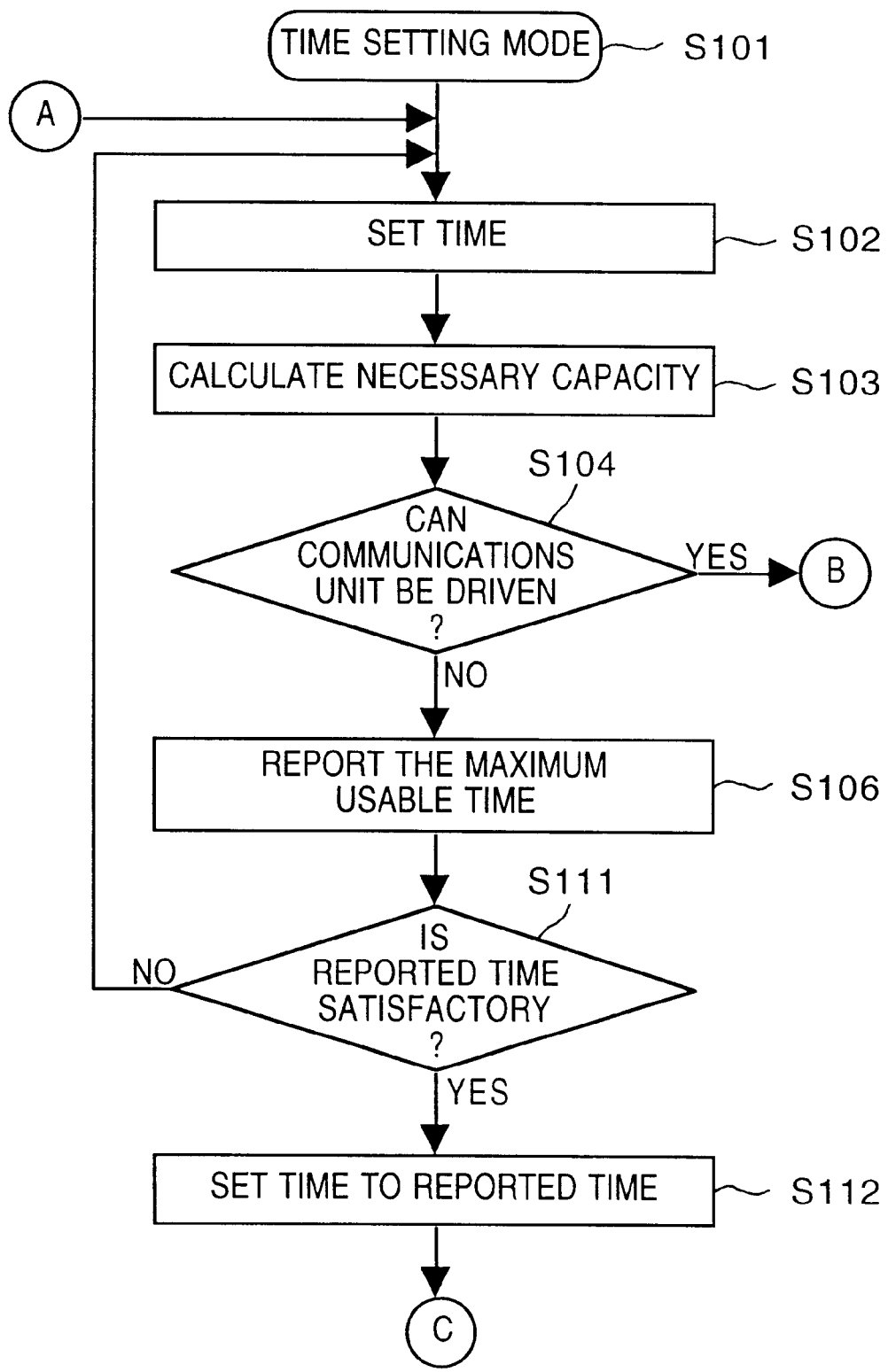
FIG. 2 is a flowchart of a time setting mode for setting time until which the communications unit is usable according to the embodiment.
Figure 3:
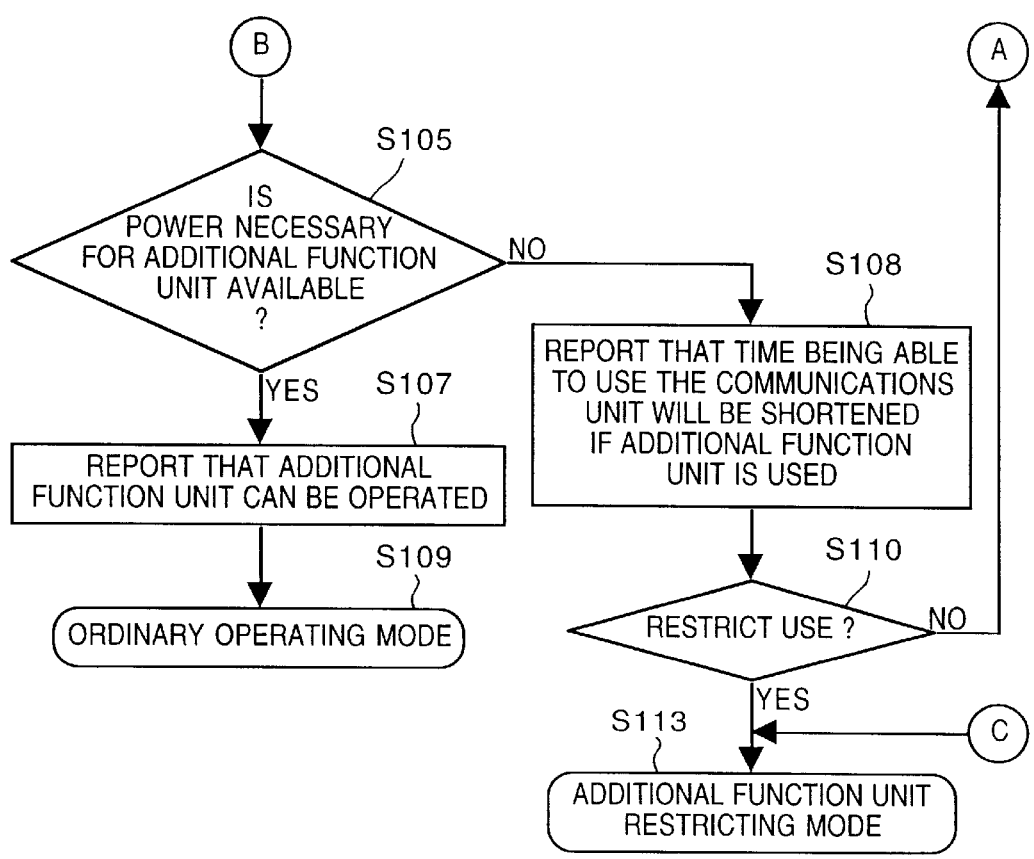
FIG. 3 is a flowchart of a time setting mode for setting time until which the communications unit is desired to be usable according to the embodiment.

FIGS. 2 and 3 are flowcharts of the time setting mode for setting a time until which the communications unit 102 is desired to be usable. Setting the time setting mode (S101) is made by operating a key provided on the time setting unit 107. The time setting unit 107 notifies the CPU 101 of the time, which has been keyed in by the user, until which the communications unit 102 is desired to be usable (step S102).

The time until which the communications unit 102 is usable is a time at which residual battery electric energy of battery is sufficient to communicate for a planned communication time. In other words, from the time, the user can communicate for the planned communication time. The planned communication time may be keyed in by the user via the time setting unit 107.

Next, the CPU 101 calculates the electric energy necessary for the communications unit to operate up to the set time based upon the power consumption value Pa, per unit time, that has been set in the communications unit power-consumption setting unit 108. A power consumption value, Pb, that has been set in the additional function unit power-consumption setting unit 109, the electric energy, Pc, that is desired to remain at the set time and the time measured by the timekeeping unit 110 (step S103) are also used. For example, if the time duration of use of the communications unit 102 is to 6:00 PM and the present time is 10:00 AM, then the power necessary to drive the communications unit 102 until the set time will be Pa×8.

Furthermore, the CPU 101 compares the result (e.g., Pa×8) of the calculation of step S103 with the value of residual battery capacity acquired from the residual battery energy sensor 105 and determines whether the residual battery capacity is larger or not, i.e., the communications unit 102 is capable being driven until the set time (step S104). The program proceeds to step S105 if the residual battery capacity is larger and to step S106 if the residual battery capacity is smaller. If the program proceeds to step S105, this assures enough battery capacity to drive the communications unit 102 until the set time. That is, if the residual battery capacity is larger, then the CPU 101 determines, based upon the value that has been set beforehand in the additional function unit power-consumption setting unit 109, whether or not the additional function unit 103 is capable of being operated by the power obtained by subtracting the power used to operate the communications unit 102 until the set time from the residual battery energy (step S105).

If there is enough residual battery capacity to operate the additional function unit 103, then the CPU 101 so notifies the user by the indicator 112 (step S107) and the program proceeds to the usual operating mode (step S109). It should be noted that the indication made by the indicator 112 may be a visual display by an LCD or LED or an audio indication made by a speaker. Furthermore, it is possible to display the number of images that can be captured by the additional function unit 103 based upon the residual battery energy sensor 105, the setting units 107, 108, 109 and the timekeeping unit 110. If the residual battery capacity is not enough to operate the additional function unit 103, then the CPU 101 notifies the user, by way of the indicator 112, that the time duration of the use the communications unit must be curtailed if the additional function unit 103 is to be used (step S108). Furthermore, the CPU 101 allows the user to select whether or not to place a restriction on the use of the additional function unit 103 (step 110). A key for making this selection is provided on the time setting unit 107. If the user selects to place a restriction on use of the additional function unit 103, then the program proceeds to the additional-function restriction mode (step S113). If the user selects not to restrict use of the additional function unit 103, then processing is repeated starting from the time setting step (S102).

If it is found at step S104 that the residual battery capacity is smaller, i.e., that the communications unit 102 cannot be driven until the set time, then, on the basis of the power consumption value Pa that has been set in the communications unit power-consumption setting unit 108, the present residual battery capacity, Pd, acquired from the residual battery energy sensor 105 and the value of time, Ta, measured by the timekeeping unit 110, the CPU 101 calculates the time until which the communications unit is capable of being used (e.g., the maximum usable time) and reports this to the user by the indicator 112 (step S106). The maximum usable time is obtained by performing the calculation Ta+ (Pd−Pc)/Pa. Furthermore, the user is allowed to select whether or not the time calculated at step S106 is used as the set time (step S111). A key for making this selection is provided on the time setting unit 107. If the user decides that the calculated time should not be used as the set time, then the program returns to the time setting step (S102). If the user decides that the calculated time is used as the set time, then the CPU 101 makes the set time the time that was calculated at step S106 (step S112) and the program proceeds to the additional-function restriction mode (step S113).

FIG. 4 is a flowchart of the ordinary operating mode. This mode is when the battery possesses enough power to enable operation of the additional function unit 103 while maintaining power for driving the communications unit 102. In other words, this mode is used when the status of the apparatus is such that all functions can be used. It is important to monitor residual battery capacity that decreases due to use of the additional function unit 103. When the transition is made to the ordinary operating mode (step S121), the residual battery energy sensor 105 senses residual battery capacity (step S122) and the CPU 101 determines, based upon the sensed value of residual battery capacity, whether or not the power needed to operate the additional function unit 103 is inadequate (step S123).

If the power is adequate, the CPU 101 maintains the ordinary operating mode and control proceeds to step S122. If power is inadequate, the CPU 101 notifies the user, by way of the indicator 112, that there is too little residual battery capacity (step S124) and allows the user to select whether or not to reset the time (step S125). If the user selects to reset the time, then the program proceeds to the time setting mode (step S127). If the user selects not to reset the time, then the CPU 101 allows the user to select whether or not to place a restriction on use of the additional function unit 103 (step S126). If the user selects not to place a restriction on use of the additional function unit 103, then the program proceeds to the time setting mode (step S127). If the user selects to place a restriction on use of the additional function unit 103, then the program proceeds to the additional-function unit restricting mode (step S128).

By executing the processing from step S122, whenever one image is captured by the additional function unit 103, the user can confirm whether or not addition images can be captured.

In the case where power needed to operate the additional function unit 103 has not been set, this can be dealt with by making step S128 "DRIVING COMMUNICATIONS UNIT UNTIL SET TIME IS NOT POSSIBLE".

FIG. 5 is a flowchart of the additional-function unit restricting mode. This mode is for the purpose of restricting (inhibiting) use of the additional function unit 103 ensure adequacy of the power used by the communications unit 102. When a transition is made to the additional-function restricting mode (step S131), CPU 101 restricts or inhibits use of the additional function unit 103 and notifies the user via the indicator 112 (step S130). And the residual battery energy sensor 105 senses residual battery capacity (step S132), whereupon the CPU 101, based upon the result of residual battery capacity detection, determines whether or not power needed to operate the additional function unit 103 is inadequate (step S133).

If power needed to operate the additional function unit 103 is inadequate, then the program returns to step S130. If power needed to operate the additional function unit 103 is adequate, then the CPU 101 notifies the user, via the indicator 112, of the fact that the additional function unit 103 is capable of being used (step S134). The program then proceeds to the ordinary operating mode (step S135). This sequence (step S132 through step S135) is for a dealing with a change in the state of power usage by the communications unit 102. In a case where the communications unit 102 exhibits a constant power consumption or in a case where there is no setting of power needed to operate the additional function unit 103, only the use of the additional function unit 103 need be restricted.

Figure 6:
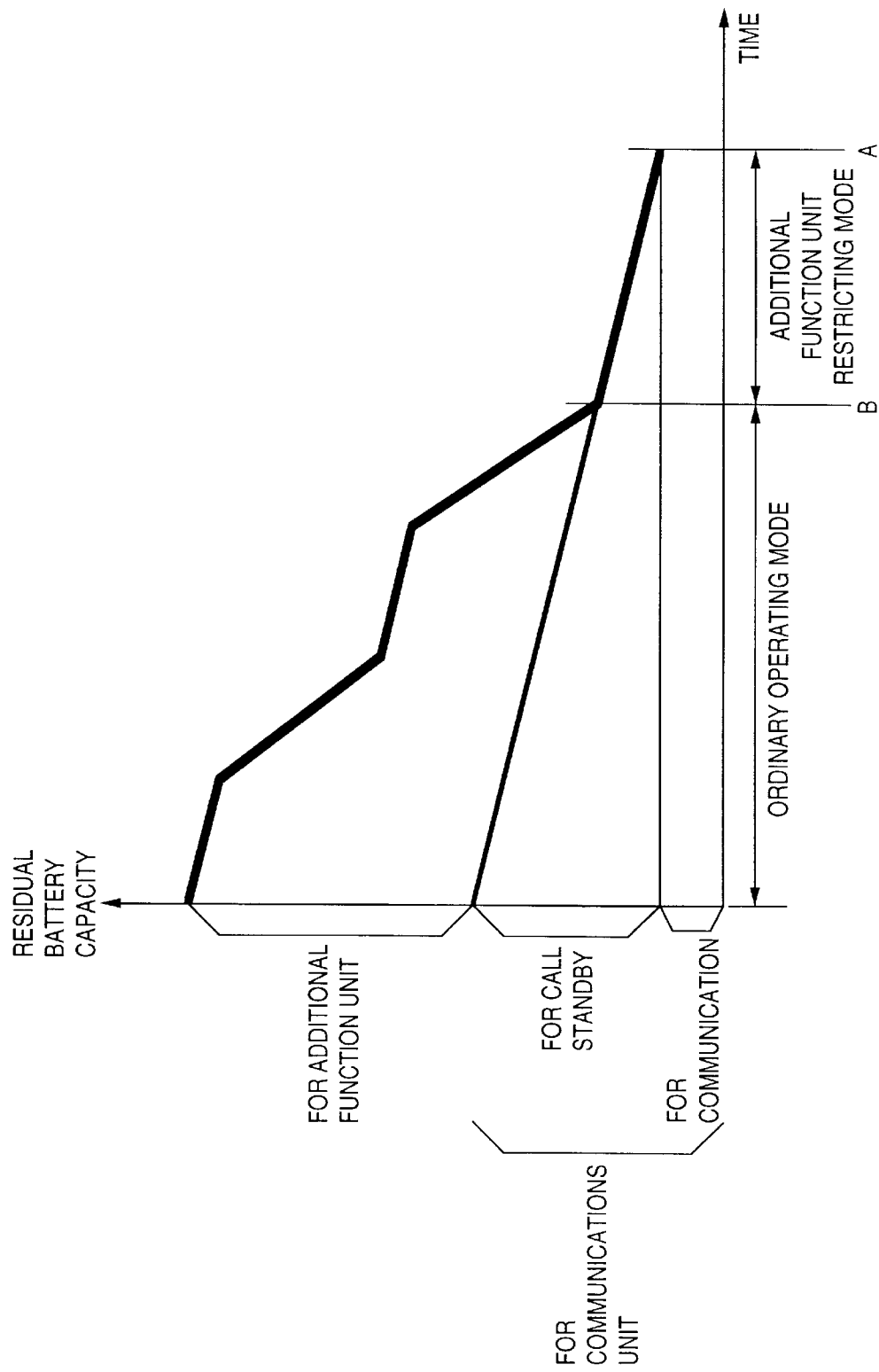
FIG. 6 is an explanatory view illustrating a change in residual battery capacity with time according to the embodiment.

FIG. 6 is a graph in which time is plotted along the horizontal axis and residual battery capacity along the vertical axis. FIG. 6 illustrates an example in which there is a transition from the ordinary operating mode to the additional-function unit restricting mode. Point A in FIG. 6 represents the time, set by the time setting unit 107, until which the communications unit is usable. The boldest line represents the total amount of residual battery capacity, the next boldest line represents the total value of electric energy predicted to be necessary for call standby and actual communication, and the fine line represents the electric energy necessary for actual communication. The breakdown of electric energy used in the communications unit 102 up to point A is calculated using two parameters as power for call standby and power for actual communication. The residual battery capacity for allowing use of the additional function unit 103 vanishes at point B, whence the transition is made to the additional-function unit restricting mode. The power for call standby primarily is the power needed by the communications unit 102 to detect a call signal transmitted from a base station via a wireless link. The power for actual communication is primarily that needed by the communications unit 102 to send and receive communication signals. These two types of power are set by the communications unit power-consumption setting unit 108.

In this example, the predetermined amount of electric energy for actual communication remain and electric energy for call standby constantly diminish with time. In actuality, however, radio wave output must be increased or radio waves must be output more frequently in areas where the conditions are not conducive to good transmission and reception of radio waves, as a consequence of which the amount of power consumption increases even when the call standby state is the same. By supposing a plurality of conditions, storing a power consumption for each one and changing the calculated value of total electric energy for the communications unit 102, modes can be set more accurately.

Figure 7:
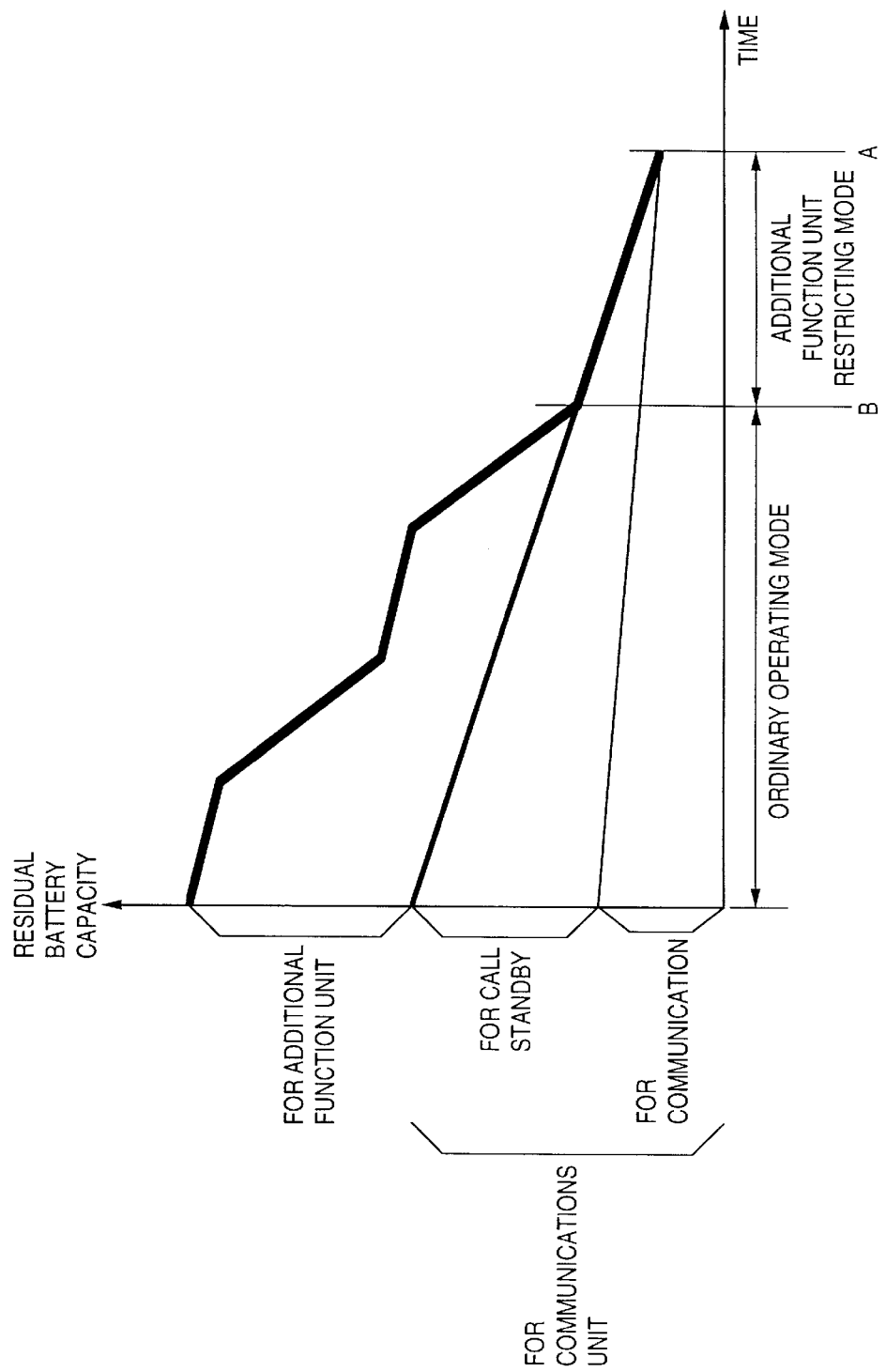
FIG. 7 is an explanatory view illustrating a change in residual battery capacity with time according to the embodiment.

FIG. 7 illustrates an example substantially the same as that of FIG. 6 except that here the design is such that the electric energy for communication also diminishes with time in the same manner as for call standby. In a case where the communication operation is performed frequently, it will suffice to adopt an arrangement in which the slope of the illustrated straight line is increased.

Figure 8:
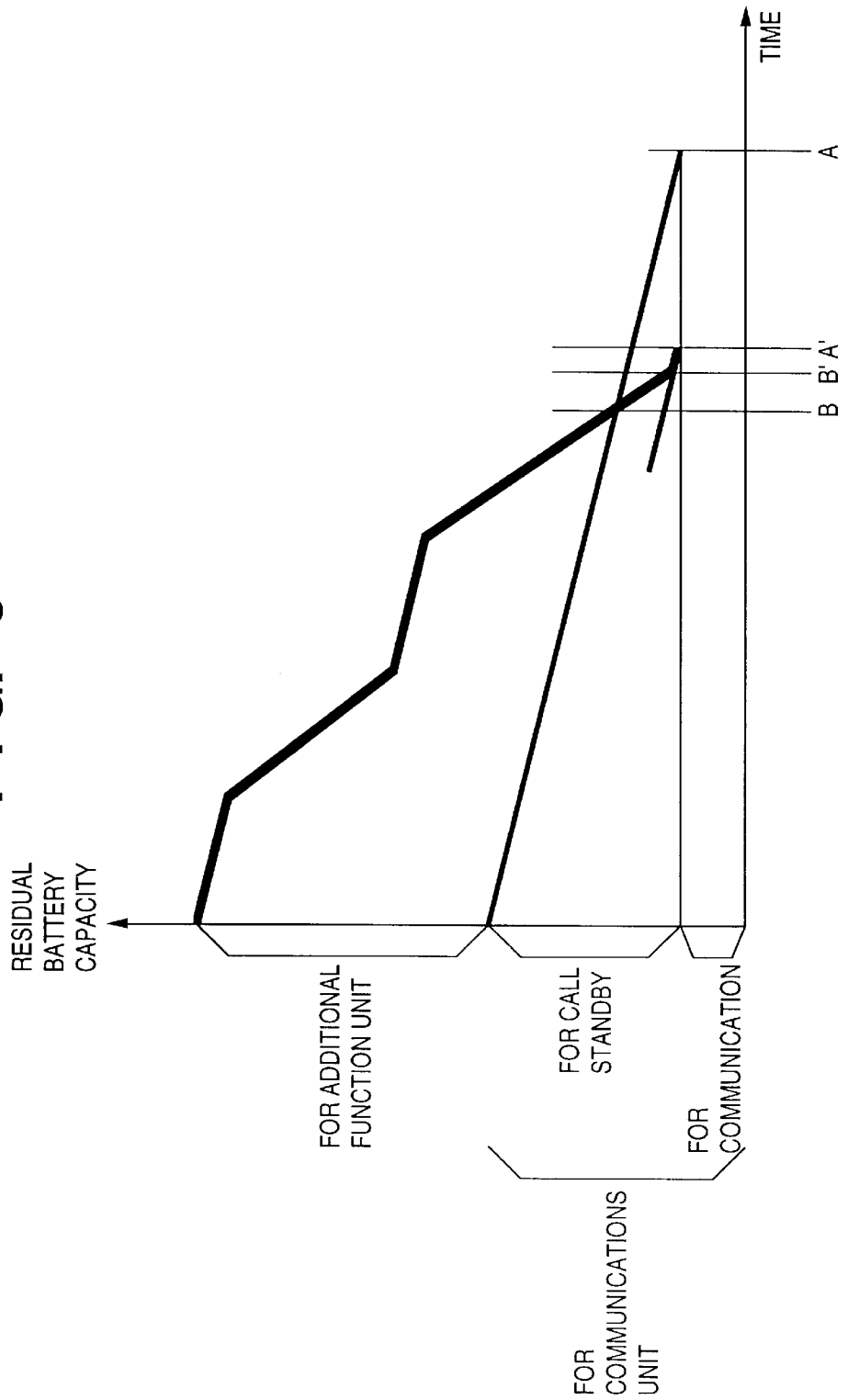
FIG. 8 is an explanatory view illustrating a change in residual battery capacity with time according to the embodiment.

FIG. 8 illustrates an example substantially the same as that of FIG. 6 except that whereas the transition to the additional-function unit restricting mode is made at point B in FIG. 6, here the time until which the communications unit is desired to be usable is reset from the initially planned value A to a shorter value A' by the time setting unit 107, whereby it is possible to use the additional function unit 103 up to point B'.

Figure 9:
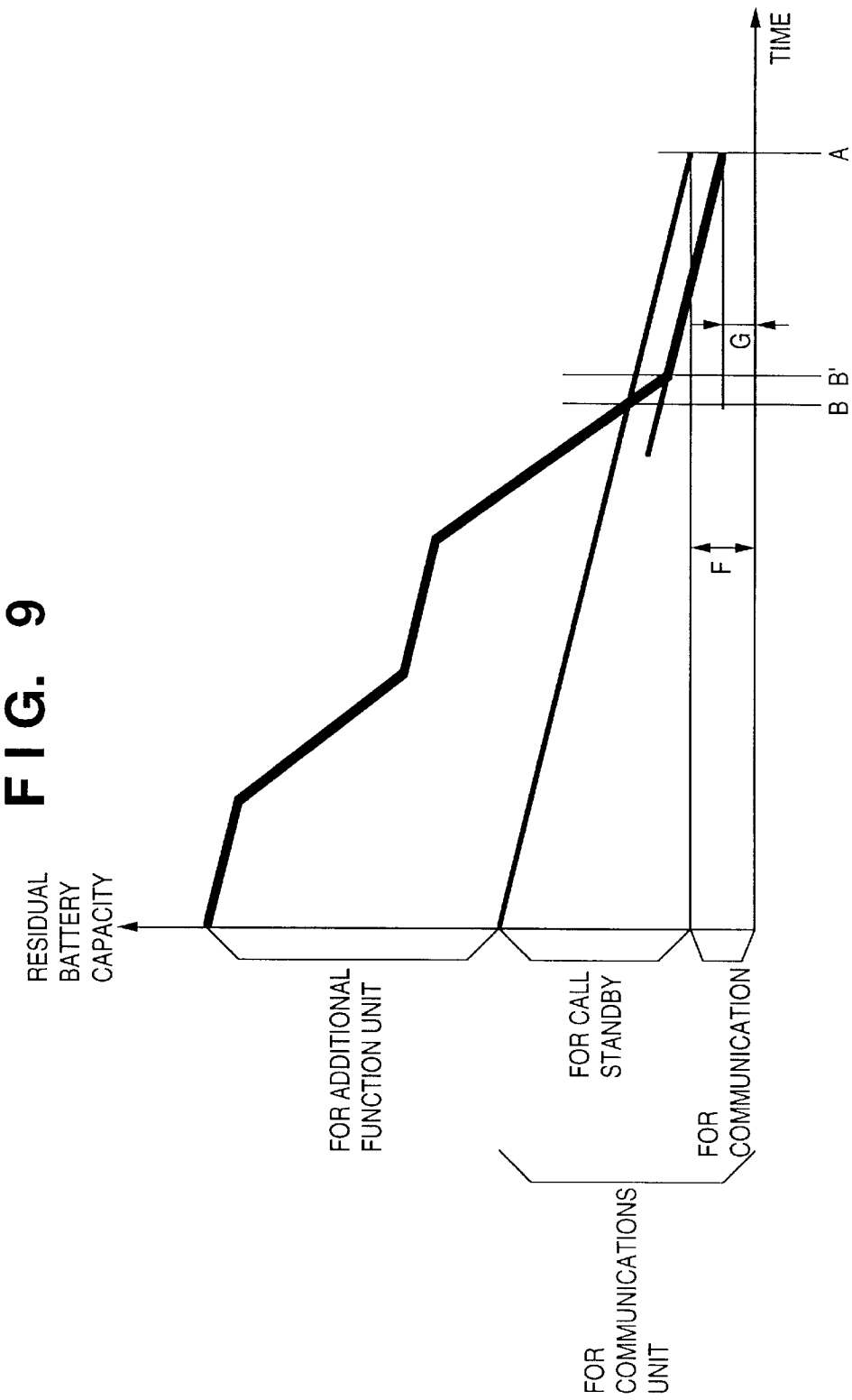
FIG. 9 is an explanatory view illustrating a change in residual battery capacity with time according to the embodiment.

FIG. 9 illustrates an example substantially the same as that of FIG. 6 except that whereas the transition to the additional-function unit restricting mode is made at point B in FIG. 6, here the planned communication time is shortened by the time setting unit 107 and so the electric energy to be left is changed from F to G while the setting of time A until which the communications unit is usable is left as is, whereby it is possible to use the additional function unit 103 up to point B'.

By performing control of the kind described above, it is possible to secure operation of the communications unit 102 up to the set time.

Further, since amounts of power consumption according to various conditions which prevail when the communications unit 102 is performing voice communication, when the communications unit 102 is performing data communication (transmitting images captured by the additional function unit 103) and when the communications unit 102 is standing by for a call are capable of being set by the communications unit power-consumption setting unit 108, it is possible for the CPU 101 to set an amount of power consumption that conforms to the condition of the communications unit 102. Furthermore, since notification to restrict use of the additional function unit 103 is given by the indicator 112 and then the user can restrict the use, it is possible to prevent an unfortunate situation in which power can no longer be supplied to the communications unit 102 because too much battery capacity has been consumed by the additional function unit 103 before the user realizes it.

Further, the additional function unit power-consumption setting unit 109 is capable of setting the amount of power consumed by the additional function unit 103 in regard to each of two cases, namely a case in which a picture is taken without using a flash and a case in which a picture is taken using a flash. The CPU 101 uses the indicator 112 to notify the user, through the steps S110, S124 and S134, whether or not it is possible to take a picture using flash or without using a flash. In a case where a picture can be taken without using a flash, the CPU 101 restricts (inhibits) use of the flash at step S130 and makes possible photography without using the flash.

Next, processing when the secondary-battery charge controller 106 take control of charging the battery unit 104 in a case where the battery unit 104 is a secondary battery will be described. Based upon the signal representing the residual battery capacity obtained from the residual battery energy sensor 105 and the set values from the time setting unit 107 and communications unit power-consumption setting unit 108, it is possible to determine whether or not the communications unit 102 is capable of being used up to the set time.

Figure 10:
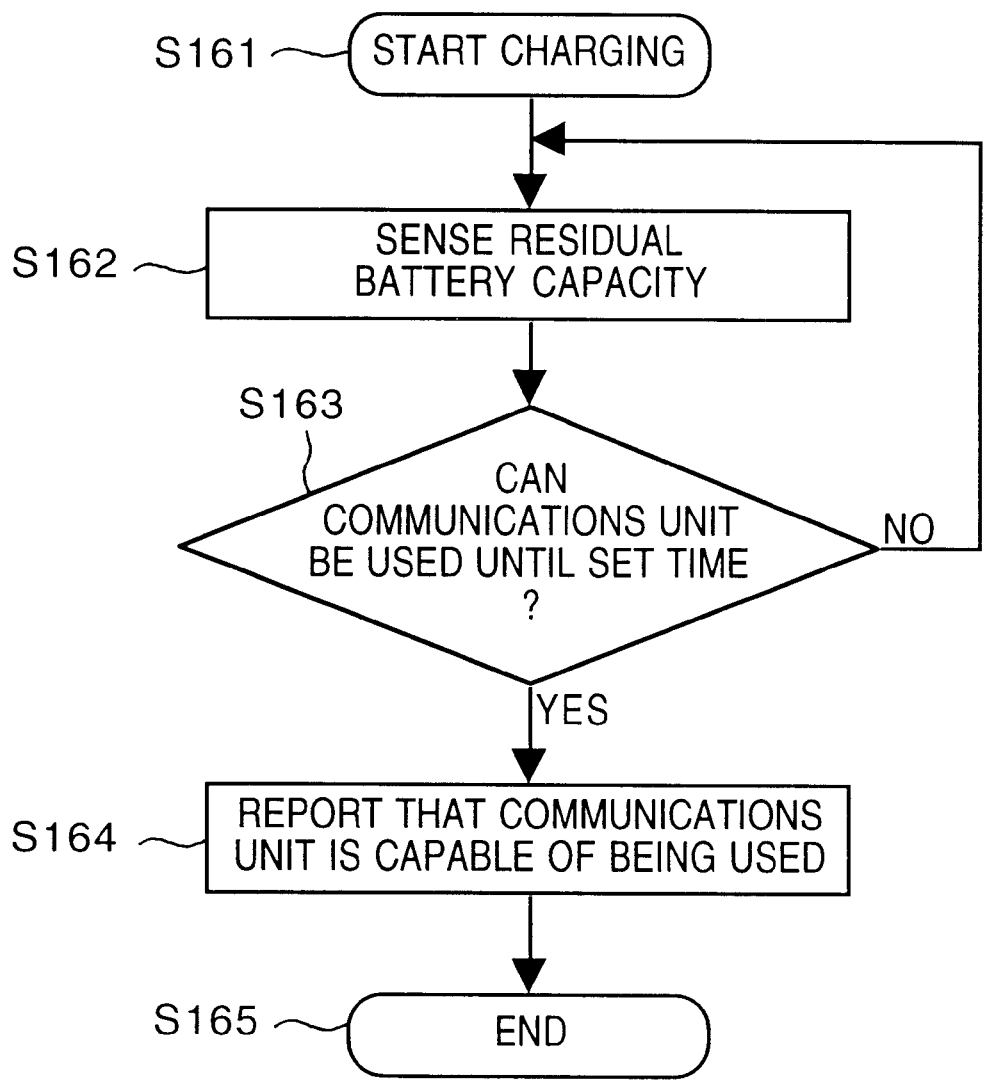
FIG. 10 is a flowchart of processing for notifying a user, at the time of a charging operation that the communications unit is capable of being used according to the embodiment.

FIG. 10 is a flowchart illustrating the flow of processing at the time of such a charging operation. When charging starts (step S161), the residual battery energy sensor 105 senses the residual battery capacity (step S162), whereupon the CPU 101 determines whether or not power to allow the communications unit 102 to be used until the set time has been accumulated (step S163). If not enough power for use of the communications unit 102 has been accumulated, the program returns to step S162. If enough power has been accumulated, on the other hand, then the CPU 101 notifies the user that the communications unit 102 is capable of being used (step S164) and ends processing of this flowchart (step S165).

By performing control in this manner, it is possible to determine during charging whether or not the battery has been charged to a state in which the communications unit 102 is usable until the set time. This is effective when the user decides that it is satisfactory for only the communications unit 102 to be used.

In the flowchart of FIG. 2, the user sets the time at step S102 by means of the time setting unit 107. A modification of the invention in which, alternatively, the setting of time is performed automatically will now be described.

In the system according to this modification, when charge starting information is acquired from the secondary-battery charge controller 106, the time from the timekeeping unit 110 is stored in the memory unit 111 as charge starting time of the secondary battery. If, as the result of acquiring the charge starting information predetermined times, it is found that there are many occasions where charging is started around 10:00 PM, for example, then the time until which the communications unit is desired to be usable is set to 10:00 PM.

Further, in a case where position information is capable of being received from the communications unit 102, as in the manner of the Personal Handyphone System (PHS), both the position information and the charge starting time is registered in the memory unit 111. And then statistical information is gathered for each location at which charging is performed and the time until which the communications unit is desired to be usable is set. Acquiring the position information makes it easy to make an estimate of charge starting time. For example, when the user leaves one charging location after charging is performed, the estimated charge starting time at a location at which charging is expected to be performed next may be set as the time until which the communications unit is desired to be usable, which means that two or more charge starting times may be set.

Figure 11:
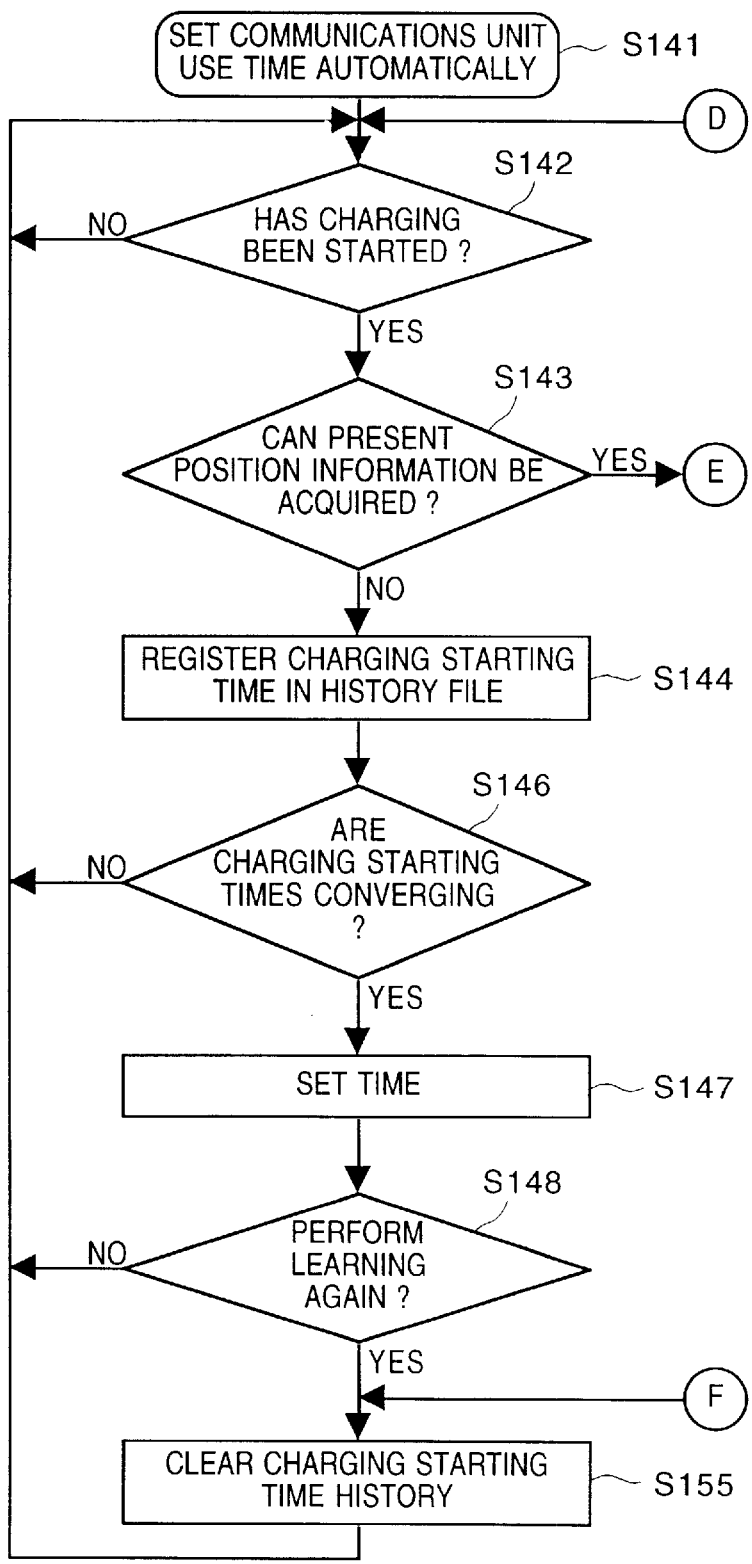
FIG. 11 is a flowchart of processing for setting a time until which the communications unit is desired to be usable according to the embodiment.
Figure 12:
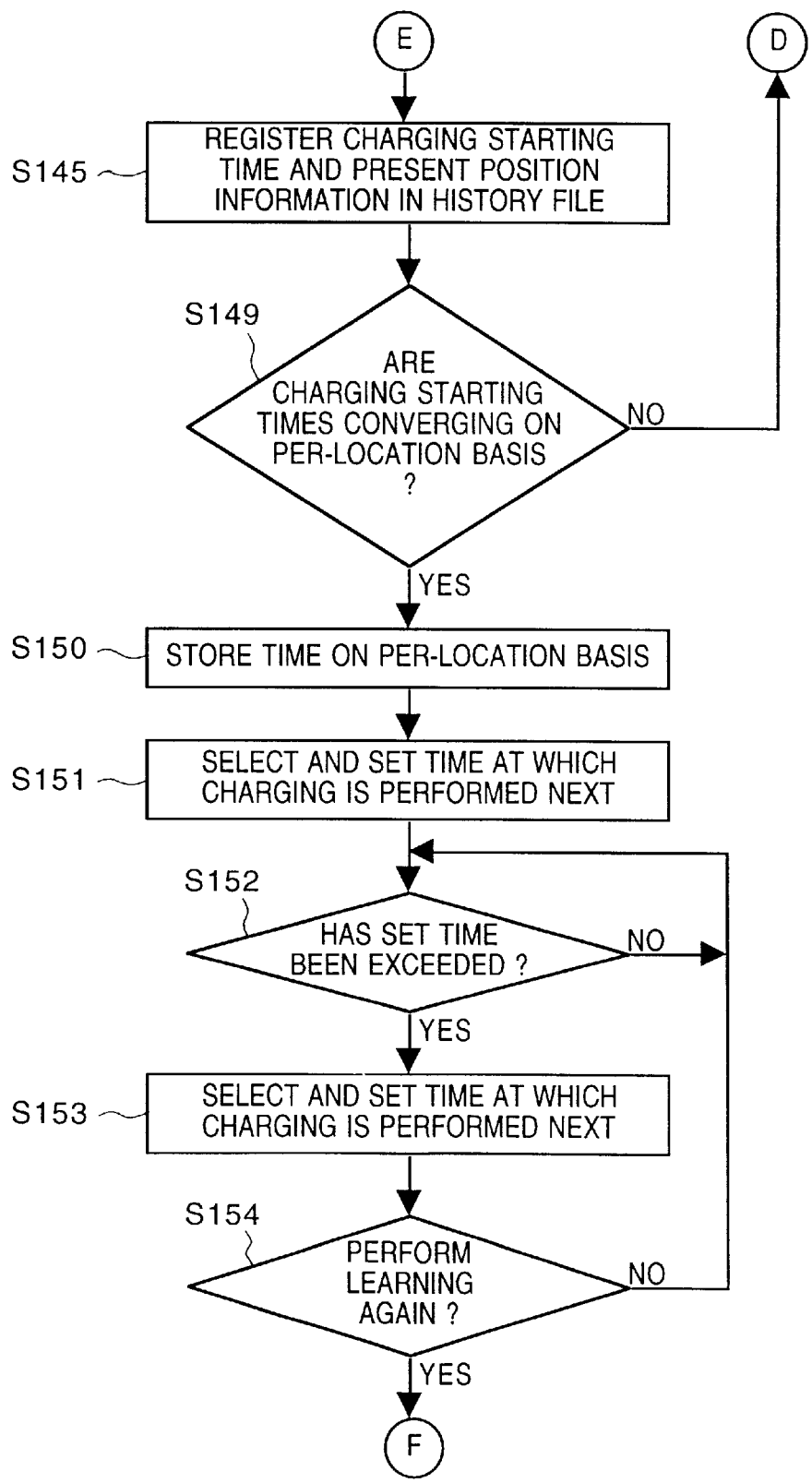
FIG. 12 is a flowchart of processing for setting a time until which the communications unit is desired to be usable according to the embodiment.

FIGS. 11 and 12 are flowcharts illustrating the flow of the above-mentioned processing used in the system according to this modification.

When processing for automatically setting the time until which the communications unit is to be usable starts (step S141), in order to register the charge starting time, the CPU 101 determines whether or not charging has started (step S142). If the CPU 101 determines that charging has started, it then determines whether information concerning the present location is capable of being acquired (step S143). If this information cannot be acquired, the CPU 101 registers the charge starting time in a history file (step S144) and then determines when the history of charge starting time statistically concentrates (step S146).

If the history of charging starting time is statistically converging, i.e., if deviations in the charge starting times registered at step S144 are examined and sufficient data for which a standard charge starting time can be discriminated, the CPU 101 sets the time, which has been calculated at step S146, as the time until which the communications unit is to be usable (step S147). If the data is insufficient, the program proceeds to step S142. Next, the CPU 101 determines whether or not to perform the registration process again (step S148). The CPU 101 maintains the present state until reregistration is performed. If reregistration is to be performed, the CPU 101 clears the history file of charge starting time (step S155) and control shifts to step S142.

When the time is set at step S147, the CPU 101 uses this set time to execute the processing from step S103 onward in FIG. 2.

If it is found at step S143 that present position information can be acquired, the CPU 101 registers the charge starting time and the present position information in the history file in association with each other (step S145). Next, the CPU 101 determines whether or not the history of charge starting time concentrates on a per-location basis. More specifically, in regard to the information that has been registered at step S145, the CPU 101 classifies the charge starting time according to location, examines the statistical deviation for each location and repeats the collection of information until only data for which a standard charge starting time can be discriminated (step S149). If it is judged that such information has not been collected, the program returns to step S142. If it is judged that such information has been collected, the CPU 101 discriminates and stores the standard charge starting time in the memory unit 111, location by location (step S150). In other words, there is a possibility that a plurality of charge starting times may be set.

Next, the CPU 101 selects the nearest charge starting time as viewed from the present time and sets this time as the time until which the communications unit is capable of being used (step S151). The CPU 101 then determines whether or not the set time has passed (step S152). If the set time has passed, then the CPU 101 compares this with the present time, selects the next charge starting time and sets the next charge starting time as the time until which the communications unit is desired to be usable (step S153). Next, the CPU 101 determines whether reregistration is to be performed (step S154). If reregistration is not to be carried out, the program returns to step S152. If the CPU 101 determines that the set time has been exceeded and that reregistration is to be performed, the program proceeds to step S155 and the history file of charge starting times is cleared.

When time is set at steps S151, S153, the CPU 101 uses the set time to execute the processing from step S103 onward in FIG. 2.

By virtue of the control described above, the time until which the communications unit is to be usable can be set automatically in the time setting unit 107 of FIG. 1 based upon the charge starting information obtained from the secondary-battery charging controller 106. It should be noted that this time may be presented as a recommended value by the indicator 112 before the time is actually set, thereby allowing the user to select whether or not this time is agreeable.

The present invention can be applied to a system constituted by a plurality of devices or to an apparatus comprising a single device.

Further, it goes without saying that the object of the present invention can also be achieved by providing a storage medium storing program codes for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the functions according to the embodiment, and the storage medium storing the program codes constitutes the invention.

The storage medium, such as a floppy disk, hard disk, optical disk, magneto-optical disk, CD-ROM, CD-R, magnetic tape, non-volatile type memory card or ROM can be used to provide the program codes.

Furthermore, besides the case there the aforesaid functions according to the embodiments are implemented by executing the program codes read by a computer, it goes without saying that the scope of the present invention covers a case where an operating system or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus comprising:

battery means;

communication means powered by said battery means;

setting means for setting time, by an operator; and control means for controlling a function other than the communication function of said communication means so that said battery means has capacity for enabling said communication means, at the time set by said setting means, to perform communication for a predetermined period of time.

2. The apparatus according to claim 1, wherein said control means restricts the function other than the communication function.

3. The apparatus according to claim 1, wherein said control means restricts the function other than the communication function in dependence upon elapsed time.

4. The apparatus according to claim 1, wherein said control means controls the function other than the communication function in dependence upon a decline in residual capacity of said battery means.

5. The apparatus according to claim 1, wherein said control means controls the function other than the communication function in dependence upon power consumed by said communication means.

6. The apparatus according to claim 1, wherein said control means has display means for presenting a display relating to the function other than the communication function, in dependence upon the time and the status of said battery means.

7. The apparatus according to claim 1, wherein said control means has display means for presenting a display in accordance with the set time and the status of said battery means while said battery means is being charged.

8. The apparatus according to claim 1, wherein said setting means sets the time in dependence upon a time at which said battery means is charged.

9. The apparatus according to claim 1, wherein the function other than the communication function include a function for capturing an image.

10. The apparatus according to claim 1, wherein the function other than the communication function include a photography function using a strobe and a photography function not using a strobe.

11. A control method for controlling a communication apparatus having communication means powered by battery means, comprising the steps of:

setting time, by an operator; and controlling a function other than a communication function of said communication means so that said battery means has capacity for enabling said communication means, at the time set by said setting means, to perform communication for a predetermined period of time.

12. The method according to claim 11, wherein said control step restricts the function other than the communication function.

13. The method according to claim 11, wherein the function other than the communication function include a function for capturing an image.

14. The method according to claim 11, wherein the function other than the communication function include a photography function using a strobe and a photography function not using a strobe.

15. A storage medium storing a control program for controlling a communication apparatus having communication means powered by battery means, comprising the steps of:
   setting time, by an operator; and
   controlling a function other than a communication function of said communication means so that said battery means has capacity for enabling said communication means, at the time set by said setting means, to perform communication for a predetermined period of time.

16. The storage medium according to claim 15, wherein said control means restricts the function other than the communication function.

17. The storage medium according to claim 15, wherein the function other than the communication function include a function for capturing an image.

18. The storage medium according to claim 15, wherein the function other than the communication function include a photography function using a strobe and a photography function not using a strobe.

19. A storage medium storing a control program for controlling a communication apparatus having communication means powered by battery means, comprising:
   setting means for setting a time, depending on an operation by a user, until which a communication function of said communication means is to be available; and
   control means for controlling a function other than the communication function of said communication means in dependence upon a state of said battery means and power required by said communication means until the set time.

20. The storage medium according to claim 19, wherein the status of said battery means includes remaining capacity of said battery means.

21. The storage medium according to claim 19, wherein said control means restricts the function other than the communication function.

22. The storage medium according to claim 19, wherein said control means restricts the function other than the communication function in dependence upon elapsed time.

23. The storage medium according to claim 19, wherein said control means controls the function other than the communication function in such a manner that said battery means will be capable of driving said communication means until the set time.

24. The storage medium according to claim 19, wherein the function other than the communication function include a function for capturing an image.

25. The storage medium according to claim 19, wherein the function other than the communication function include a photography function using a strobe and a photography function not using a strobe.

26. A storage medium storing a control program for controlling a communication apparatus having communication means powered by battery means, comprising:
   setting means for setting time in dependence upon a location at which said battery means is charged; and
   control means for controlling a function other than a communication function of said communication means in dependence upon the time set by said setting means and a state of said battery means.

27. A communication apparatus having communication means powered by battery means, comprising:
   setting means for setting a time, depending on an operation by a user, until which a communication function of said communication means is to be available; and
   control means for controlling a function other than the communication function of said communication means in dependence upon a state of said battery means and power required by said communication means until the set time.

28. The apparatus according to claim 27, wherein the status of said battery means includes remaining capacity of said battery means.

29. The apparatus according to claim 27, wherein said control means restricts the function other than the communication function.

30. The apparatus according to claim 27, wherein said control means restricts the function other than the communication function in dependence upon elapsed time.

31. The apparatus according to claim 27, wherein said control means controls the function other than the communication function in such a manner that said battery means will be capable of driving said communication means until the time.

32. The apparatus according to claim 27, wherein the function other than the communication function includes a function for capturing an image.

33. The apparatus according to claim 27, wherein the function other than the communication function includes a photography function using a strobe and a photography function not using a strobe.

34. A communication apparatus having communication means powered by battery means, comprising:
   setting means for setting time in dependence upon a location at which said battery means is charged;
   control means for controlling a function other than a communication function of said communication means in dependence upon the time set by said setting means and a state of said battery means.

35. A control method for controlling a communication apparatus having communication means powered by battery means, comprising the steps of:
   setting time, depending on an operation by a user, until which a communication function of said communication means is to be available; and
   control means for controlling a function other than the communication function of said communication means in dependence upon a state of said battery means and power required by said communication means until the set time.

36. The method according to claim 35, wherein the status of said battery means includes remaining capacity of said battery means.

37. The method according to claim 35, wherein said control step restricts the function other than the communication function.

38. The method according to claim 35, wherein said control step controls the function other than the communication function in such a manner that said battery means will be capable of driving said communication means until a prescribed time.

39. The method according to claim 35, wherein the function other than the communication function include a function for capturing an image.

40. The method according to claim 35, wherein the function other than the communication function include a photography function using a strobe and a photography function not using a strobe.

41. A control means for controlling a communication apparatus having communication means powered by battery means, comprising the steps of:
   setting time in dependence upon a location at which said battery means is charged; and
   controlling a function other than a communication function of said communication means in dependence upon the time set in said setting step and a state of said battery means.

42. A control method for controlling a communication apparatus powered by a battery and capable of performing a plurality of functions including a communication function, comprising the steps of:
   setting time, depending on an operation by a user, until which the communication function is to be available; and
   judging whether or not the battery capacity for performing the communication function until the time and performing a function other than the communication function.

43. The apparatus according to claim 42, wherein said judging means comprises display means for performing a display according to a judging result of said judging means.

44. The apparatus according to claim 42, further comprising function means for performing the plurality of functions.

45. The apparatus according to claim 42, wherein said judging means judges whether or not said battery means has capacity for performing the communication function until the time and performing a function of taking a picture.

46. The apparatus according to claim 42, wherein said judging means judges whether or not said battery means has capacity for performing the communication function until the time and performing a function of taking a picture using a flash.

47. The apparatus according to claim 42, wherein said judging means comprises restricting means for restricting the function other than the communication function in accordance with a judging result of said judging means.

48. A control method for controlling a communication apparatus powered by a battery and capable of performing a plurality of functions including a communication function, comprising the steps of:
   setting time, depending on an operation by a user, until which the communication function is to be available; and
   judging whether or not the battery has capacity for performing the communication function until the time and performing a function other than the communication function.

49. The method according to claim 48, wherein said judging step comprises a step of performing a display according to a judging result of said judging step.

50. The method according to claim 48, wherein said judging step judges whether or not the battery has capacity for performing the communication function until the time and performing a function of taking a picture.

51. The method according to claim 48, wherein said judging step judges whether or not the battery has capacity for performing the communication function until the time and performing a function of taking a picture using a flash.

52. A storage medium storing a control program for controlling a communication apparatus powered by a battery and capable of performing a plurality of functions including a communication function, the control program comprising the steps of:
   setting time, depending on an operation by a user, until which the communication function is to be available; and
   judging whether or not the batter has capacity for performing the communication function until the time and performing a function other than the communication function.

53. The storage medium according to claim 39, wherein said judging step comprises a step of performing a display according to a judging result of said judging step.

54. The storage medium according to claim 39, wherein said judging step judges whether or not the battery has capacity for performing the communication function until the time and performing a function of taking a picture.

55. The storage medium according to claim 39, wherein said judging step judges whether or not the battery has capacity for performing the communication function until the time and performing a function of taking a picture using a flash.

56. The storage medium according to claim 39, wherein said judging step comprises a step of restricting the function other than the communication function in accordance with a judging result of said judging step.

57. A communication apparatus capable of performing a plurality of functions including a communication function, comprising:
   battery means for enabling the plurality of functions; and
   judging means for judging whether or not said battery means has capacity for performing the communication function if a function other than the communication function is performed,
   wherein the capacity for performing the communication function includes capacity for power consumed by the communication function in a stand-by state.

58. The apparatus according to claim 57, wherein said judging means comprises display means for performing a display according to a judging result of said judging means.

59. The apparatus according to claim 58, further comprising function means for performing the plurality of functions.

60. The apparatus according to claim 58, wherein said judging means judges whether or not said battery means has capacity for performing the communication function if a function of taking a picture is performed.

61. The apparatus according to claim 58, wherein said judging means comprises restricting means for restricting the function other than the communication function in accordance with a judging result of said judging means.

62. A control method for controlling a communication apparatus powered by a battery and capable of performing a plurality of functions including a communication function, comprising the steps of:
   judging whether or not the battery has capacity for performing the communication function if a function other than the communication function is performed; and
   enabling the function other than the communication function if the battery has capacity for performing the communication function,
   wherein the capacity for performing the communication function includes capacity for power consumed by the communication function in a stand-by state.

63. The method according to claim 62, wherein said judging step comprising a step of performing a display according to a judging result of said judging step.

64. The method according to claim 63, wherein said judging step judges whether or not the battery has capacity for performing the communication function if a function of taking a picture is performed.

65. The method according to claim 63, wherein said judging step comprises a step of restricting the function other than the communication function in accordance with a judging result of said judging step.

66. A storage medium storing a control program for controlling a communication apparatus powered by a battery and capable of performing a plurality of functions including a communication function, the control program comprising the steps of:

judging whether or not the battery has capacity for performing the communication function if a function other than the communication function is performed; and enabling the function other than the communication function if the battery has capacity for performing the communication function, wherein the capacity for performing the communication function includes capacity for power consumed by the communication function in a stand-by state.

67. The storage medium according to claim 53, wherein said judging step comprises a step of performing a display according to a judging result of said judging step.

68. The storage medium according to claim 53, wherein said judging step judges whether or not the battery has capacity for performing the communication function if a function of taking a picture is performed.

69. The storage medium according to claim 53, wherein said judging step comprises a step of restricting the function other than the communication function in accordance with a judging result of said judging step.

* * * * *

UNITED STATES PATENT AND TRADEMARK OFFICE
CERTIFICATE OF CORRECTION

PATENT NO. : 6,501,968 B1
APPLICATION NO. : 09/061491
DATED : December 31, 2002
INVENTOR(S) : Ichimura It is certified that error appears in the above-identified patent and that said Letters Patent is hereby corrected as shown below:

Please delete columns 1 line 1 through columns 16 line 17 and insert columns 1 line 1 through columns 14 line 52 as attached Signed and Sealed this First Day of April, 2008

JON W. DUDAS
*Director of the United States Patent and Trademark Office*

BATTERY-POWERED COMMUNICATIONS APPARATUS

BACKGROUND OF THE INVENTION

This invention relates to a communications apparatus powered by a battery.

Recent advances in semiconductor techniques have led to devices of increasingly smaller size. This has made it possible to manufacture battery-powered electrical devices such as a miniature communications terminal with functions other than those of the communications terminal. For example, a device that combines a portable telephone with a digital camera makes it possible for an image captured by the digital camera to be transmitted immediately by using the data communications function of the portable telephone. Combining a communication function with others functions, in this manner, makes it possible to provide greater convenience.

When a portable telephone and a digital camera, which have been cited above as an example of a device combining a communications function with additional functions, are driven by a single power supply (battery), a large amount of the battery power is consumed by the digital camera and situations arise in which the battery becomes incapable of supplying sufficient power to the portable telephone, thereby rendering the telephone function useless, before the user becomes aware of it.

SUMMARY OF THE INVENTION

Accordingly, an object of the present invention is to improve a battery-powered communications apparatus having a communications function combined with another function.

Another object of the present invention is to prevent undesirable consumption of power.

Another object of the present invention is to prevent excessive use of a function other than a communications function.

Another object of the present invention is to prevent excessive use of functions other than a communications function, thereby preventing the communications function from becoming unusable.

A further object of the present invention is to be able to use a communications function, with certainty, until a predetermined time.

A further object of the present invention is to provide a communications apparatus in which functions other than a communications function are controlled dependent upon time and battery status.

A further object of the present invention is to provide a communications apparatus which presents a notification conforming to time and the status of a battery during the charging of the battery.

A further object of the present invention is to provide a communications apparatus in which communication means is capable of being used until the time expected that the battery is charged next.

A further object of the present invention is to provide a communications apparatus in which control consumption of power conforming to the location expected that the battery is charged next.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing a configuration of a battery-powered system having a communications function and an additional function besides the communications function according to an embodiment of the present invention;

FIG. 2 is a flowchart of a time setting mode for setting time until which the communications unit is usable according to the embodiment;

FIG. 3 is a flowchart of a time setting mode for setting time until which the communications unit is desired to be usable according to the embodiment;

FIG. 4 is a flowchart of an ordinary operating mode according to the embodiment;

FIG. 5 is a flowchart of an additional-function restricting mode according to the embodiment;

FIG. 6 is an explanatory view illustrating a change in residual battery capacity with time according to the embodiment;

FIG. 7 is an explanatory view illustrating a change in residual battery capacity with time according to the embodiment;

FIG. 8 is an explanatory view illustrating a change in residual battery capacity with time according to the embodiment;

FIG. 9 is an explanatory view illustrating a change in residual battery capacity with time according to the embodiment;

FIG. 10 is a flowchart of processing for notifying a user, at the time of a charging operation that the communications unit is capable of being used according to the embodiment;

FIG. 11 is a flowchart of processing for setting a time until which the communications unit is desired to be usable according to the embodiment; and FIG. 12 is a flowchart of processing for setting a time until which the communications unit is desired to be usable according to the embodiment.

DESCRIPTION OF THE PREFERRED EMBODIMENT

A preferred embodiment of the present invention will now be described with reference to the accompanying drawings.

Reference will first be made to FIG. 1 to describe the configuration of a battery-powered system having a communications function and an additional function, besides the communications function, according to an embodiment of the present invention. The system comprises a CPU 101, a communications unit 102, an additional function unit 103, a battery unit 104, a residual battery energy sensor 105, a secondary-battery charging controller 106, a time setting unit 107, a communications unit power-consumption setting unit 108, an additional function unit power-consumption setting unit 109, a timekeeping unit 110, a memory unit 111 and indicator 112.

The CPU 101 controls the overall system and executes processing of the type indicated by flowcharts (described later) on the basis of a control program. The communications unit 102 implements a communications function, e.g., the function of a portable telephone, and notifies the CPU 101 of its operating mode, i.e., whether a call is in progress or the unit is standing by for a call. The additional function unit 103 implements a function other than the communications function, e.g., the function of a digital camera or the like, and is controlled by the CPU 101. The additional function unit 103 may capture images but it should be noted that the additional function unit 103 is not limited to the digital camera function but can have any additional function as necessary.

The battery unit 104 is the power supply for the overall system and comprises a primary battery (a dry cell or the like) or a secondary battery (a lead storage battery, alkaline storage battery, etc.). The residual battery energy sensor 105 senses the residual energy of the battery unit 104 and notifies the CPU 101. If the battery unit 104 is a secondary battery, the secondary-battery charging controller 106 controls the charging of the secondary battery. The time setting unit 107 sets the time until which it is desired for the communications unit 102 to be usable. According to this embodiment, the time setting unit 107 is constructed as an independent functional block. However, the invention is not limited to this arrangement and it is permissible for the time setting unit 107 to be included in the communications unit 102.

The communications unit power-consumption setting unit 108 sets the power consumption of the communications unit 102. According to this embodiment, the communications unit power-consumption setting unit 108 is constructed as an independent functional block for explanation purposes. However, the invention is not limited to this arrangement and it is permissible for the communications unit power-consumption setting unit 108 to be included in the communications unit 102. The additional function unit power-consumption setting unit 109 sets the power consumption of the additional function unit 103. This timekeeping unit 110 notifies the CPU 101 of the present time. The memory unit 111 stores data needed by each system component based upon control performed by the CPU 101. Numeral 112 denotes an indicator. It should be noted that the power consumption of the communications unit 102 and the power consumption of the additional function unit 103 may be pre-registered in the memory unit 111. Further, the arrangement illustrated in the specification of Japanese Patent Application Laid-Open (KOKAI) No. 7-120538 can be used as the residual battery energy sensor 105. Though Japanese Patent Application Laid-Open No. 7-120538 displays the remaining capacity of a secondary battery, in this embodiment the remaining capacity of a secondary battery is input to the CPU 101.

The operation of this battery-powered system having a communications function and an additional function other than the communications function according to this embodiment will be described in regard to a time setting mode (FIGS. 2 and 3) in which the time until which the communications unit 102 is desired to be usable is set, an ordinary operating mode (FIG. 4) and an additional function unit restricting mode (FIG. 5).

FIGS. 2 and 3 are flowcharts of the time setting mode for setting a time unit which the communications unit 102 is desired to be usable. Setting the time setting mode (S101) is made by operating a key provided on the time setting unit 107. The time setting unit 107 notifies the CPU 101 of the time, which has been keyed in by the user, until which the communications unit 102 is desired to be usable (step S102).

The time until which the communications unit 102 is usable is a time at which residual battery electric energy of battery is sufficient to communicate for a planned communication time. In other words, from the time, the user can communicate for the planned communication time. The planned communication time may be keyed in by the user via the time setting unit 107.

Next, the CPU 101 calculates the electric energy necessary for the communications unit to operate up to the set time based upon the power consumption value Pa, per unit time, that has been set in the communications unit power-consumption setting unit 108. A power consumption value, Pb, that has been set in the additional function unit power-consumption setting unit 109, the electric energy, Pc, that is desired to remain at the set time and the time measured by the timekeeping unit 110 (step S103) are also used. For example, if the time duration of use of the communications unit 102 is to 6:00 PM and the present time is 10:00 AM, then the power necessary to drive the communications unit 102 until the set time will be Pax8.

Furthermore, the CPU 101 compares the result (e.g., Pax8) of the calculation of step S103 with the value of residual battery capacity acquired from the residual battery energy sensor 105 and determines whether the residual battery capacity is larger or not, i.e., the communications unit 102 is capable being driven until the set time (step S104). The program proceeds to step S105 if the residual battery capacity is larger and to step S106 if the residual battery capacity is smaller. If the program proceeds to step S105, this assures enough battery capacity to drive the communications unit 102 until the set time. That is, if the residual battery capacity is larger, then the CPU 101 determines, based upon the value that has been set beforehand in the additional function unit power-consumption setting unit 109, whether or not the additional function unit 103 is capable of being operated by the power obtained by subtracting the power used to operate the communications unit 102 until the set time from the residual battery energy (step S105).

If there is enough residual battery capacity to operate the additional function unit 103, then the CPU 101 so notifies the user by the indicator 112 (step S107) and the program proceeds to the usual operating mode (step S109). It should be noted that the indication made by the indicator 112 may be a visual display by an LCD or LED or an audio indication made by a speaker. Furthermore, it is possible to display the number of images that can be captured by the additional function unit 103 based upon the residual battery energy sensor 105, the setting units 107, 108, 109 and the timekeeping unit 110. If the residual battery capacity is not enough to operate the additional function unit 103, then the CPU 101 notifies the user, by way of the indicator 112, that the time duration of the user the communications unit must be curtailed if the additional function unit 103 is to be used (step S108). Furthermore, the CPU 101 allows the user to select whether or not to place a restriction on the user of the additional function unit 103 (step S110). A key for making this selection is provided on the time setting unit 107. If the user selects to place a restriction on use of the additional function unit 103, then the program proceeds to the additional-function restriction mode (step S113). If the user selects not to restrict use of the additional function unit 103, then processing is repeated starting from the time setting step (S102).

If it is found at step S104 that the residual battery capacity is smaller, i.e., that the communications unit 102 cannot be driven until the set time, then, on the basis of the power consumption value Pa that has been set in the communications unit power-consumption setting unit 108, the present residual battery capacity, Pd, acquired from the residual battery energy sensor 105 and the value of time, Ta, measured by the timekeeping unit 110, the CPU 101 calculates the time until which the communications unit is capable of being used (e.g., the maximum usable time) and reports this to the user by the indicator 112 (step S106). The maximum usable time is obtained by performing the calculation Ta+ (Pd-Pc)/Pa. Furthermore, the user is allowed to select whether or not the time calculated at step S106 is used as the set time (step S111). A key for making this selection is provided on the time setting unit 107. If the user decides that the calculated time should not be used as the set time, then the program returns to the time setting step (S102). If the user decides that the calculated time is used as the set time, then the CPU 101 makes the set time the time that was calculated at step S106 (step S112) and the program proceeds to the additional-function restriction mode (step S113).

FIG. 4 is a flowchart of the ordinary operating mode. This mode is when the battery possesses enough power to enable operation of the additional function unit 103 while maintaining power for driving the communications unit 102. In other words, this mode is used when the status of the apparatus is such that all functions can be used. It is important to monitor residual battery capacity that decreases due to use of the additional function unit 103. When the transition is made to the ordinary operating mode (step S121), the residual battery energy sensor 105 senses residual battery capacity (step S122) and the CPU 101 determines, based upon the sensed value of residual battery capacity, whether or not the power needed to operate the additional function unit 103 is inadequate (step S123).

If the power is adequate, the CPU 101 maintains the ordinary operating mode and control proceeds to step S122. If power is inadequate, the CPU 101 notifies the user, by way of the indicator 112, that there is too little residual battery capacity (step S124) and allows the user to select whether or not to reset the time (step S125). If the user selects to reset the time, then the program proceeds to the time setting mode (step S127). If the user selects not to reset the time, then the CPU 101 allows the user to select whether or not to place a restriction on use of the additional function unit 103 (step S126). If the user selects not to place a restriction on use of the additional function unit 103, then the program proceeds in the time setting mode (step S127). If the user selects to place a restriction on use of the additional function unit 103, then the program proceeds to the additional-function unit restricting mode (step S128).

By executing the processing from step S122, whenever one image is captured by the additional function unit 103, the user can confirm whether or not addition images can be captured.

In the case where power needed to operate the additional function unit 103 has not been set, this can be dealt with by making step S128 "DRIVING COMMUNICATIONS UNIT UNTIL SET TIME IS NOT POSSIBLE".

FIG. 5 is a flowchart of the additional-function unit restricting mode. This mode is for the purpose of restricting (inhibiting) use of the additional function unit 103 ensure adequacy of the power used by the communications unit 102. When a transition is made to the additional-function restricting mode (step S131), CPU 101 restricts or inhibits use of the additional function unit 103 and notifies the user via the indicator 112 (step S130). And the residual battery energy sensor 105 senses residual battery capacity (step S132), whereupon the CPU 101, based upon the result of residual battery capacity detection, determines whether or not power needed to operate the additional function unit 103 is inadequate (step S133).

If power needed to operate the additional function unit 103 is inadequate, then the program returns to step S130. If power needed to operate the additional function unit 103 is adequate, then the CPU 101 notifies the user, via the indicator 112, of the fact that the additional function unit 103 is capable of being used (step S134). The program then proceeds to the ordinary operating mode (step S135). This sequence (step S132 through step S135) is for a dealing with a change in the state of power usage by the communications unit 102. In a case where the communications unit 102 exhibits a constant power consumption or in a case where there is no setting of power needed to operate the additional function unit 103, only the use of the additional function unit 103 need be restricted.

FIG. 6 is a graph in which time is plotted along the horizontal axis and residual battery capacity along the vertical axis. FIG. 6 illustrates an example in which there is a transition from the ordinary operating mode to the additional-function unit restricting mode. Point A in FIG. 6 represents the time, set by the time setting unit 107, until which the communications unit is usable. The boldest line represents the total amount of residual battery capacity, the next boldest line represents in the total value of electric energy predicted to be necessary for call standby and actual communication, and the fine line represents the electric energy necessary for actual communication. The breakdown of electric energy used in the communications until 102 up to point A is calculated using two parameters as power for call standby and power for actual communication. The residual battery capacity for allowing use of the additional function unit 103 vanishes at point B, whence the transition is made to the additional-function unit restricting mode. The power for call standby primarily is the power needed by the communications unit 102 to detect a call signal transmitted from a base station via a wireless link. The power for actual communication is primarily that needed by the communications unit 102 to send and receive communication signals. These two types of power are set by the communications unit power-consumption setting unit 109.

In this example, the predetermined amount of electric energy for actual communication remain and electric energy for call standby constantly diminish with time. In actuality, however, radio wave output must be increased or radio waves must be output more frequently in areas where the conditions are not conducive to good transmission and reception of radio waves, as a consequence of which the amount of power consumption increases even when the call standby state is the same. By supposing a plurality of conditions, storing a power consumption for each one and changing the calculated value of total electric energy for the communications unit 102, modes can be set more accurately.

FIG. 7 illustrates an example substantially the same as that of FIG. 6 except that here the design is such that the electric energy for communication also diminishes with time in the same manner as for call standby. In a case where the communication operation is performed frequently, it will suffice to adopt an arrangement in which the slope of the illustrated straight line is increased.

FIG. 8 illustrates an example substantially the same as that of FIG. 6 except that whereas the transition to the additional-function unit restricting mode is made at point B in FIG. 6, here the time until which the communications unit is desired to be usable is reset from the initially planned value A to a shorter value A' by the time setting unit 107, whereby it is possible to use the additional function unit 103 up to point B'.

FIG. 9 illustrates an example substantially the same as that of FIG. 6 except that whereas the transition to the additional-function unit restricting mode is made at point B in FIG. 6, here the planned communication time is shortened by the time setting unit 107 and so that electric energy to be left is changed from F to G while the setting of time A until which the communications unit is usable is left as is, whereby it is possible to use the additional function unit 103 up to point B'.

By performing control of the kind described above, it is possible to secure operation of the communications unit 102 up to the set time.

Further, since amounts of power consumption according to various conditions which prevail when the communications unit 102 is performing voice communication, when the communications unit 102 is performing data communication (transmitting images captured by the additional function unit 103) and when the communications unit 102 is standing by for a call are capable of being set by the communications unit power-consumption setting unit 108, it is possible for the CPU 101 to set an amount of power consumption that conforms to the condition of the communications unit 102. Furthermore, since notification to restrict use of the additional function unit 103 is given by the indicator 112 and then the user can restrict the use, it is possible to prevent an unfortunate situation in which power can no longer be supplied to the communications unit 102 because too much battery capacity has been consumed by the additional function unit 103 before the user realizes it.

Further, the additional function unit power-consumption setting unit 109 is capable of setting the amount of power consumed by the additional function unit 103 in regard to each of two cases, namely a case in which a picture is taken without using a flash and a case in which a picture is taken using a flash. The CPU 101 uses the indicator 112 to notify the user, through the steps S110, S124 and S134, whether or not it is possible to take a picture using flash or without using a flash. In a case where a picture can be taken without using a flash, the CPU 101 restricts (inhibits) use of the flash at step S130 and makes possible photography without using the flash.

Next, processing when the secondary-battery change controller 106 take control of changing the battery unit 104 in a case where the battery unit 104 is a secondary battery will be described. Based upon the signal representing the residual battery capacity obtained from the residual battery energy sensor 105 and the set values from the time setting unit 107 and communications unit power-consumption setting unit 108, it is possible to determine whether or not the communications unit 102 is capable of being used up to the set time.

FIG. 10 is a flowchart illustrating the flow of processing at the time of such a charging operation. When charging starts (step S161), the residual battery energy sensor 105 senses the residual battery capacity (step S162), whereupon the CPU 101 determines whether or not to allow the communications unit 102 to be used until the set time has been accumulated (step S163). If not enough power for use of the communications unit 102 has been accumulated, the program returns to step S162. If enough power has been accumulated, on the other hand, then the CPU 101 notifies the user that the communications unit 102 is capable of being used (step S164) and ends processing of this flowchart (step S165).

By performing control in this manner, it is possible to determine during charging whether or not the battery has been charged to a state in which the communications unit 102 is usable until the set time. This is effective when the user decides that it is satisfactory for only the communications unit 102 to be used.

In the flowchart of FIG. 2, the user sets the time at step S102 by means of the time setting unit 107. A modification of the invention in which, alternatively, the setting of time is performed automatically will now be described.

In the system according to this modification, when charge starting information is acquired from the secondary-battery charge controller 106, the time from the timekeeping unit 110 is stored in the memory unit 111 as charge starting time of the secondary battery. If, as the result of acquiring the charge starting information predetermined times, it is found that there are many occasions where charging is started around 10:00 PM, for example, then the time until which the communications unit is desired to be usable is set to 10:00 PM.

Further, in a case where position information is capable of being received from the communications unit 102, as in the manner of the Personal Handyphone System (PHS), both the position information and the charge starting time is registered in the memory unit 111. And then statistical information is gathered for each location at which charging is performed and the time until which the communications unit is desired to be usable is set. Acquiring the position information makes it easy to make an estimate of charge starting time. For example, when the user leaves one charging location after charging is performed, the estimated charge starting time at a location at which charging is expected to be performed next may be set as the time until which the communications unit is desired to be usable, which means that two or more charge starting times may be set.

FIGS. 11 and 12 are flowcharts illustrating the flow of the above-mentioned processing used in the system according to this modification.

When processing for automatically setting the time until which the communications unit is to be usable starts (step S141), in order to register the charge starting time, the CPU 101 determines whether or not charging has started (step S142). If the CPU 101 determines that charging has started, it then determines whether information concerning the present location is capable of being acquired (step S143). If this information cannot be acquired, the CPU 101 registers the charge starting time in a history file (step S144) and then determines when the history of charge starting time statistically concentrates (step S146).

If the history of charging starting time is statistically converging, i.e., if deviations in the charge starting times registered at step S144 are examined and sufficient data for which a standard charge starting time can be discriminated, the CPU 101 sets the time, which has been calculated at step S146, as the time until which the communications unit is to be usable (step S147). If the data is insufficient, the program proceeds to step S142. Next, the CPU 101 determines whether or not to perform the registration process again (step S148). The CPU 101 maintains the present state until reregistration is performed. If reregistration is to be performed, the CPU 101 clears the history file of charge starting time (step S155) and control shifts to step S142.

When the time is set at step S147, the CPU 101 uses this set time to execute the processing from step S103 onward in FIG. 2.

If it is found at step S143 that present position information can be acquired, the CPU 101 registers the charge starting time and the present position information in the history file in association with each other (step S145). Next, the CPU 101 determines whether or not the history of charge starting time concentrates on a per-location basis. More specifically, in regard to the information that has been registered at step S145, the CPU 101 classifies the charge starting time according to location, examines the statistical deviation for each location and repeats the collection of information until only data for which a standard charge starting time can be discriminated (step S149). If it is judged that such information has not been collected, the program returns to step S142. If it is judged that such information has been collected, the CPU 101 discriminates and stores the standard charge starting time in the memory unit 111, location by location (step S150). In other words, there is a possibility that a plurality of charge starting times may be set.

Next, the CPU 101 selects the nearest charge starting time as viewed from the present time and sets this time as the time until which the communications unit is capable of being used (step S151). The CPU 101 then determines whether or not the set time has passed (step S152). If the set time has passed, then the CPU 101 compares this with the present time, selects the next charge starting time and sets the next charge starting time as the time until which the communications unit is desired to be usable (step S153). Next, the CPU 101 determines whether reregistration is to be performed (step S154). If reregistration is not to be carried out, the program returns to step S152. If the CPU 101 determines that the set time has been exceeded and that reregistration is to be performed, the program proceeds to step S155 and the history file of charge starting times is cleared.

When time is set at steps S151, S153, the CPU 101 uses the set time to execute the processing from step S103 onward in FIG. 2.

By virtue of the control described above, the time until which the communications unit is to be usable can be set automatically in the time setting unit 107 of FIG. 1 based upon the charge starting information obtained from the secondary-battery charging controller 106. It should be noted that this time may be presented as a recommended value by the indicator 112 before the time is actually set, thereby allowing the user to select whether or not this time is agreeable.

The present invention can be applied to a system constituted by a plurality of devices or to an apparatus comprising a single device.

Further, it goes without saying that the object of the present invention can also be achieved by providing a storage medium storing program codes for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the functions according to the embodiment, and the storage medium storing the program codes constitutes the invention.

The storage medium, such as a floppy disk, hard disk, optical disk, magneto-optical disk, CD-ROM, CD-R, magnetic tape, non-volatile type memory card or ROM can be used to provide the program codes.

Furthermore, besides the case there the aforesaid functions according to the embodiments are implemented by executing the program codes read by a computer, it goes without saying that the scope of the present invention covers a case where an operating system or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus comprising:
   battery means;
   communication means powered by said battery means;
   setting means for setting time, by an operator; and
   control means for controlling a function other than a communication function of said communication means so that said battery means has capacity for enabling said communication means, at the time set by said setting means, to perform communication for a predetermined period of time.

2. The apparatus according to claim 1, wherein said control means restricts the function other than the communication function.

3. The apparatus according to claim 1, wherein said control means restricts the function other than the communication function in dependence upon elapsed time.

4. The apparatus according to claim 1, wherein said control means controls the function other than the communication function in dependence upon a decline in residual capacity of said battery means.

5. The apparatus according to claim 1, wherein said control means controls the function other than the communication function in dependence upon power consumed by said communication means.

6. The apparatus according to claim 1, wherein said control means has display means for presenting a display relating to the function other than the communication function, in dependence upon the time and the status of said battery means.

7. The apparatus according to claim 1, wherein said control means has display means for presenting a display in accordance with the set time and the status of said battery means while said battery means is being charged.

8. The apparatus according to claim 1, wherein said setting means sets the time in dependence upon a time at which said battery means is charged.

9. The apparatus according to claim 1, wherein the function other than the communication function include a function for capturing an image.

10. The apparatus according to claim 1, wherein the function other than the communication function include a photography function using a strobe and a photography function not using a strobe.

11. A control method for controlling a communication apparatus having communication means powered by battery means, comprising the steps of:
   setting time, by an operator; and
   controlling a function other than a communication function of said communication means so that said battery means has capacity for enabling said communication means, at the time set by said setting means, to perform communication for a predetermined period of time.

12. The method according to claim 11, wherein said control step restricts the function other than the communication function.

13. The method according to claim 11, wherein the function other than the communication function include a function for capturing an image.

14. The method according to claim 11, wherein the function other than the communication function include a photography function using a strobe and a photography function not using a strobe.

15. A storage medium storing a control program for controlling a communication apparatus having communication means powered by battery means, comprising the steps of:
setting time, by an operator; and
controlling a function other than a communication function of said communication means so that said battery means has capacity for enabling said communication means, at the time set by said setting means, to perform communication for a predetermined period of time.

16. The storage medium according to claim 15, wherein said control means restricts the function other than the communication function.

17. The storage medium according to claim 15, wherein the function other than the communication function include a function for capturing an image.

18. The storage medium according to claim 15, wherein the function other than the communication function include a photography function using a strobe and a photography function not using a strobe.

19. A storage medium storing a control program for controlling a communication apparatus having communication means powered by battery means, comprising:
setting means for setting a time, depending on an operation by a user, until which a communication function of said communication means is to be available; and
control means for controlling a function other than the communication function of said communication means in dependence upon a state of said battery means and power required by said communication means until the set time.

20. The storage medium according to claim 19, wherein the status of said battery means includes remaining capacity of said battery means.

21. The storage medium according to claim 19, wherein said control means restricts the function other than the communication function.

22. The storage medium according to claim 19, wherein said control means restricts the function other than the communication function in dependence upon elapsed time.

23. The storage medium according to claim 19, wherein said control means controls the function other than the communication function in such a manner that said battery means will be capable of driving said communication means until the set time.

24. The storage medium according to claim 19, wherein the function other than the communication function include a function for capturing an image.

25. The storage medium according to claim 19, wherein the function other than the communication function include a photography function using a strobe and a photography function not using a strobe.

26. A storage medium storing a control program for controlling a communication apparatus having communication means powered by battery means, comprising:
setting means for setting time in dependence upon a location at which said battery means is charged; and
control means for controlling a function other than a communication function of said communication means in dependence upon the time set by said setting means and a state of said battery means.

27. A communication apparatus having communication means powered by battery means, comprising:
setting means for setting a time, depending on an operation by a user, until which a communication function of said communication means is to be available; and
control means for controlling a function other than the communication function of said communication means in dependence upon a state of said battery means and power required by said communication means until the set time.

28. The apparatus according to claim 27, wherein the status of said battery means includes remaining capacity of said battery means.

29. The apparatus according to claim 27, wherein said control means restricts the function other than the communication function.

30. The apparatus according to claim 27, wherein said control means restricts the function other than the communication function in dependence upon elapsed time.

31. The apparatus according to claim 27, wherein said control means controls the function other than the communication function in such a manner that said battery means will be capable of driving said communication means until the time.

32. The apparatus according to claim 27, wherein the function other than the communication function includes a function for capturing an image.

33. The apparatus according to claim 27, wherein the function other than the communication function includes a photography function using a strobe and a photography function not using a strobe.

34. A communication apparatus having communication means powered by battery means, comprising:
setting means for setting time in dependence upon a location at which said battery means is charged;
control means for controlling a function other than a communication function of said communication means in dependence upon the time set by said setting means and a state of said battery means.

35. A control method for controlling a communication apparatus powered by a battery and capable of performing a plurality of functions including a communication function, comprising the steps of:
setting time, depending on an operation by a user, until which the communication function is to be available; and
judging whether or not the battery has capacity for performing the communication function until the time and performing a function other than the communication function.

36. The method according to claim 35, wherein said judging step comprises a step of performing a display according to a judging result of said judging step.

37. The method according to claim 35, wherein said judging step judges whether or not the battery has capacity for performing the communication function until the time and performing a function of taking a picture.

38. The method according to claim 35, wherein said judging step judges whether or not the battery has capacity for performing the communication function until the time and performing a function of taking a picture using a flash.

39. A storage medium storing a control program for controlling a communication apparatus powered by a battery and capable of performing a plurality of functions including a communication function, the control program comprising the steps of:
- setting time, depending on an operation by a user, until which the communication function is to be available; and
- judging whether or not the battery has capacity for performing the communication function until the time and performing a function other than the communication function.

40. The storage medium according to claim 39, wherein said judging step comprises a step of performing a display according to a judging result of said judging step.

41. The storage medium according to claim 39, wherein said judging step judges whether or not the battery has capacity for performing the communication function until the time and performing a function of taking a picture.

42. The storage medium according to claim 39, wherein said judging step judges whether or not the battery has capacity for performing the communication function until the time and performing a function of taking a picture using a flash.

43. The storage medium according to claim 39, wherein said judging step comprises a step of restricting the function other than the communication function in accordance with a judging result of said judging step.

44. A communication apparatus capable of performing a plurality of functions including a communication function, comprising:
- battery means for enabling the plurality of functions; and
- judging means for judging whether or not said battery means has capacity for performing the communication function if a function other than the communication function is performed,
- wherein the capacity for performing the communication function includes capacity for power consumed by the communication function in a stand-by state.

45. The apparatus according to claim 44, wherein said judging means comprises display means for performing a display according to a judging result of said judging means.

46. The apparatus according to claim 45, further comprising function means for performing the plurality of functions.

47. The apparatus according to claim 45, wherein said judging means judges whether or not said battery means has capacity for performing the communication function if a function of taking a picture is performed.

48. The apparatus according to claim 45, wherein said judging means comprises restricting means for restricting the function other than the communication function in accordance with a judging result of said judging means.

49. A control method for controlling a communication apparatus powered by a battery and capable of performing a plurality of functions including a communication function, comprising the steps of:
- judging whether or not the battery has capacity for performing the communication function if a function other than the communication function is performed; and
- enabling the function other than the communication function if the battery has capacity for performing the communication function,
- wherein the capacity for performing the communication function includes capacity for power consumed by the communication function in a stand-by state.

50. The method according to claim 49, wherein said judging step comprising a step of performing a display according to a judging result of said judging step.

51. The method according to claim 50, wherein said judging step judges whether or not the battery has capacity for performing the communication function if a function of taking a picture is performed.

52. The method according to claim 50, wherein said judging step comprises a step of restricting the function other than the communication function in accordance with a judging result of said judging step.

53. A storage medium storing a control program for controlling a communication apparatus powered by a battery and capable of performing a plurality of functions including a communication function, the control program comprising the steps of:
- judging whether or not the battery has capacity for performing the communication function if a function other than the communication function is performed; and
- enabling the function other than the communication function if the battery has capacity for performing the communication function,
- wherein the capacity for performing the communication function includes capacity for power consumed by the communication function in a stand-by state.

54. The storage medium according to claim 53, wherein said judging step comprises a step of performing a display according to a judging result of said judging step.

55. The storage medium according to claim 53, wherein said judging step judges whether or not the battery has capacity for performing the communication function if a function of taking a picture is performed.

56. The storage medium according to claim 53, wherein said judging step comprises a step of restricting the function other than the communication function in accordance with a judging result of said judging step.

* * * * *